(12) United States Patent
Sato

(10) Patent No.: US 9,922,633 B2
(45) Date of Patent: Mar. 20, 2018

(54) WAVEFORM WRITING DEVICE, METHOD OF WRITING WAVEFORMS, ELECTRONIC MUSICAL INSTRUMENT, AND STORAGE MEDIUM

(71) Applicant: CASIO COMPUTER CO., LTD., Tokyo (JP)

(72) Inventor: Hiroki Sato, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 15/459,792

(22) Filed: Mar. 15, 2017

(65) Prior Publication Data

US 2017/0278503 A1 Sep. 28, 2017

(30) Foreign Application Priority Data

Mar. 23, 2016 (JP) .................. 2016-058773

(51) Int. Cl.
*G10H 7/00* (2006.01)
*G06F 17/30* (2006.01)
*G11B 20/10* (2006.01)

(52) U.S. Cl.
CPC ....... *G10H 7/008* (2013.01); *G06F 17/30743* (2013.01); *G06F 17/30778* (2013.01); *G11B 20/10527* (2013.01); *G10H 2240/161* (2013.01); *G11B 2020/10564* (2013.01)

(58) Field of Classification Search
CPC .................. G10H 7/008; G06F 17/30743
USPC ......................................... 84/604
See application file for complete search history.

(56) References Cited

FOREIGN PATENT DOCUMENTS

JP 2007-271827 A 10/2007

*Primary Examiner* — David Warren
(74) *Attorney, Agent, or Firm* — Chen Yoshimura LLP

(57) ABSTRACT

A device for reading waveform data of a musical tone from a primary storage device and transferring the read waveform data to a secondary storage device for tone reproduction includes a processor configured to perform: retrieving, for each waveform of a plurality of waveforms that represent a musical tone stored in the primary storage device, segment group information from the primary storage device; retrieving the plurality of waveforms that represent the musical tone from the primary storage device, the waveform group retrieval process retrieving a waveform or waveforms, among the plurality of waveforms, that have the same segment group information as a group; and writing, as a single group, the waveform or waveforms, among the plurality of waveforms, that have the same segment group information onto one of prescribed storage segments that are storage regions of prescribed sizes in the secondary storage device.

12 Claims, 20 Drawing Sheets

| No. | Tone Name | Waveform Address Offset (Hexadecimal) | Waveform Size (Hexadecimal) | Used Segment Number |
|---|---|---|---|---|
| 0 | Piano | 00000000 | 00100000 | 9 |
| 1 | E.Piano | 00100000 | 00100000 | 6 |
| 2 | Organ | 00200000 | 00040000 | 2 |
| ⋮ | | | | |
| 8 | Clavinet | 00800000 | 00080000 | 5 |
| 9 | Vibraphone | 00900000 | 000A0000 | 3 |
| ⋮ | | | | |
| 15 | Drums 2 | 00F00000 | 00100000 | 7 |

Flash Memory Tone Information Table

FIG. 4A

| Waveform No. | Min. Velocity | Max. Velocity | Min. Key No. | Max. Key No. | Address from Segment Front | Waveform Size | Segment Group |
|---|---|---|---|---|---|---|---|
| 0 (1A) | 0 | 60 | 0 | 40 | 00000H | 0A00H | 0 |
| 1 (2A) | 61 | 127 | 0 | 40 | 00A00H | 1100H | 0 |
| ⋮ | | | | | | | |
| 10 (5B) | 60 | 127 | 100 | 127 | 40000H | 0800H | 3 |
| ⋮ | | | | | | | |
| 63 | 0 | 0 | 0 | 0 | 00000H | 0 | 0 |

Tone Information Table

FIG. 4B

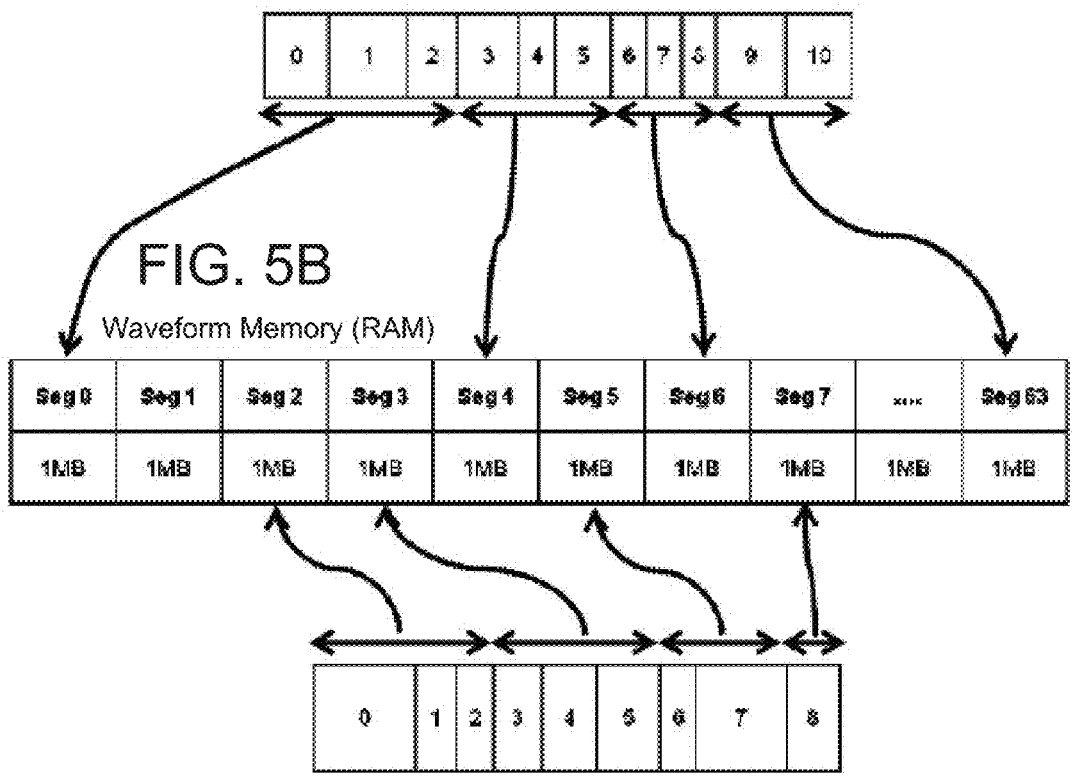
FIG. 5A Guitar Tone Waveform Data (Large-capacity Flash Memory 204)
FIG. 5B Waveform Memory (RAM)
FIG. 5C Saxophone Tone Waveform Data (Large-capacity Flash Memory 204)

| Top Structure Constant [Array Amount] | Middle Structure Constant [Array Amount] | Constant [Array Amount] | Size | Range (****H is hexadecimal) | Explanation |
|---|---|---|---|---|---|
| TONE_INF [16] | - | NAME[16] | 7bit | 0-7FH | Tone display name |
| | | WAVE_TOTAL_SIZE | 32bit | 0-FFFFFFFFH | Waveform data total size in tone |
| | | NUM_SEG | 8bit | 1-64 | No. segments used for waveform data in tone |
| | WAVE [64] | VEL_LO | 8bit | 0-127 | Original min. velocity of waveform sound range |
| | | VEL_HI | 8bit | 0-127 | Original max. velocity of waveform sound range |
| | | KEY_LO | 8bit | 0-127 | Original min. key no. of waveform sound range |
| | | KEY_HI | 8bit | 0-127 | Original max. key no. of waveform sound range |
| | | FLASH_ADRS | 32bit | 0-FFFFFFFFH | Front address on flash memory of waveform data front |
| | | SEG_ADRS | 32bit | 0-100000H | Address offset from front of segment to be read in waveform data of tone |
| | | SIZE | 32bit | 0-100000H | Size of waveform data (bytes) 0 indicates no waveform |
| | | SEG_GROUP | 8bit | 0-63 | Segment group no. Waveform data with same no. is written to same segment |
| | | TG_INF | Structure | - | Information for sound emission of waveform data by sound source (start, loop, end, address, volume, tuning information, etc.) |

FIG. 7

| Top Structure Variable [Array Amount] | Middle Structure Variable [Array Amount] | Variable [Array Amount] | Size | Range | Default | Explanation |
|---|---|---|---|---|---|---|
| -- | -- | TIMESTAMP | 32bit | 0~FFFFFFFFH | 0 | Record no. incremented 1 time for each tone selection event. Stored in SEG_INF[].TIMESTAMP during segment allocation. |
| -- | -- | CUR_TONE | 8bit | 0~15, -1 | -1 | Tone no. selected for current keyboard performance. -1 means not applicable. |
| -- | -- | TRANSFER _WAVE | 8bit | 0~63 | -1 | Waveform no. of waveform data being transferred. -1 means everything is transferred |
| SEG_INF [64] | -- | TONE | 8bit | 0~15, -1 | -1 | Tone no. of segment being allocated. -1 means empty (not in use) |
| | -- | SEG_GROUP | 8bit | 0~63 | 0 | Segment group value of tone being allocated to segment. |
| | -- | TIMESTAMP | 32bit | 0~FFFFFFFFH | 0 | Record used by segment. Incremented by 1 for each tone selection. Segments allocated at same time have same TIME_STAMP |
| | WAV_INF[64] | WAVE | 1bit | 0~1 | 0 | Presence/absence of the waveform data in the segment. 0 means absent, 1 means transferred |
| | | WAV_NUM | 8bit | 0~31, -1 | -1 | Waveform no. in tone of waveform data in segment. -1 means no allocation. |
| | | SEG_ADRS | 32bit | 0~FFFFFFFFH | 0 | Address offset of waveform data in segment |
| | | SIZE | 32bit | 0~FFFFFFFFH | 0 | Size of waveform data in segment (bytes) |

FIG. 8

WAVEFORM WRITING DEVICE, METHOD OF WRITING WAVEFORMS, ELECTRONIC MUSICAL INSTRUMENT, AND STORAGE MEDIUM

BACKGROUND OF THE INVENTION

Technical Field

The present invention relates to a waveform writing device, a method of writing waveforms, an electronic musical instrument that uses that device, and a storage medium.

Background Art

Some sound generators that generate musical note waveforms by writing waveform data employ a system in which in order to make it possible to use a larger number of waveforms as well as use waveform data of a greater length, unused waveform data is stored in ROM (a primary storage device), for example, and sounds are generated by transferring just the waveform data that needs to be used to RAM (a secondary storage device) which functions as waveform memory that the sound generator can access directly. This, in other words, enables a cost-effective approach in which waveform data of a size greater than the storage capacity of expensive RAM is stored in less expensive ROM, and then sounds are generated by moving waveform data only when necessary.

In this type of system, if there is insufficient space in RAM for writing a new tone waveform from ROM into RAM, a storage region in RAM to which another tone waveform is currently written must be overwritten.

One example of a technology for implementing this control process is the following (the technology is disclosed in Patent Document 1, for example). Here, the ROM stores one or more waveforms for each tone. A sound source large-scale integrated circuit (LSI) then references song data for a specified song, identifies which waveforms among the stored waveforms will be needed to emit the musical notes contained in that song data, and then reads the waveforms that were identified as necessary from ROM and transfers and stores those waveforms in RAM. This makes it possible to provide a musical note generator that can reduce the amount of waveform data that must be stored in RAM in order to generate the peak values of the musical notes that should be emitted.

Patent Document 1: Japanese Patent Application Laid-Open Publication No. 2007-271827

Meanwhile, in cases in which several waveforms are stored for each tone, each individual waveform must be stored sequentially in RAM because the loading structure of the sound source LSI typically does not allow for a single waveform to be divided up when stored in RAM. In other words, when selecting and storing data for a new tone in RAM, a free region of at least the size necessary to store the corresponding waveform sequentially must be prepared.

However, in conventional technologies, the placement of in-use waveform regions and unused regions in RAM becomes irregular as waveforms are repeatedly written and overwritten. This creates a problem in that even when tone waveforms that are currently written to RAM but are no longer needed are discarded in order to allocate free space that appears to be of sufficient size, there are cases in which new waveforms cannot be written because that free space is not sequential. For example, even if there are 10 regions of 400 kilobytes (KB) in size, a 500 KB waveform cannot be loaded. Therefore, additional tone waveforms in RAM must be sacrificed and discarded in order to be able to write a desired tone waveform. This not only results in extremely inefficient RAM usage in some cases but also makes the device more difficult to use because it becomes unclear whether or not a given tone can be written, even when the same tone waveform is already present in RAM. For example, when tones A, B, and C are currently written to RAM and then the device attempts to write a new tone D from ROM into RAM, it is unclear what needs to happen—in some cases the new tone can be written as-is, while in other cases tone A must be overwritten, and in still other cases both tones A and B must be overwritten, for example.

A similar problem occurs on general-purpose computers and the like that similarly have a primary storage device and a secondary storage device, but in these cases this problem can be solved by implementing processes such as defragmentation and garbage collection to collect all of the storage regions used by each file into a single location. Moreover, in the realm of computer devices that do not have the same requirements related to constant real time operation that musical instruments have, the user can even perform such processes manually.

However, these processes require an extremely long time to run and cannot be executed when a tone is selected on an electronic musical instrument, for example. Meanwhile, having the user manually perform such processes when the instrument is not being played creates an additional mental burden for the user and is therefore not a preferable solution for a musical instrument.

The present invention therefore aims to make it possible to reliably write a new waveform when a tone for which the corresponding waveform is not currently present in the secondary storage device is selected and a new tone waveform needs to be written from the primary storage device into the secondary storage device in order to avoid inefficient states in which the desired waveform cannot be written even though amount of free space is far greater than the size of the waveform itself. Accordingly, the present invention is directed to a scheme that substantially obviates one or more of the problems due to limitations and disadvantages of the related art.

SUMMARY OF THE INVENTION

Additional or separate features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, in one aspect, the present disclosure provides a device for reading waveform data items of a musical tone from a primary storage device and transferring the read waveform data items to a secondary storage device for reproduction of the musical tone, the device including a processor configured to perform the following processes: a segment group information retrieval process that retrieves, for each waveform data item of a plurality of waveform data items that are stored in the primary storage device, segment group information that is stored in the primary storage device and is respectively associated with each waveform data item, the plurality of waveform data items representing a musical tone; a waveform group retrieval process that retrieves the plurality of waveform data items that represent the musical tone from the primary storage device, the waveform group retrieval process retrieving a waveform data item or waveform data items, among the plurality of waveform data items, that have the same segment group information as a group; and a writing process that writes, as a single group, the waveform data item or waveform data items, among said plurality of waveform data items, that have the same segment group information onto one of prescribed storage segments that are storage regions of prescribed sizes in the secondary storage device.

In another aspect, the present disclosure provides a method to be performed by a processor for reading waveform data of a musical tone from a primary storage device and transferring the read waveform data to a secondary storage device for tone reproduction, the method including: a segment group information retrieval process that retrieves, for each waveform data item of a plurality of waveform data items that represent a musical tone stored in the primary storage device, segment group information that is also stored in the primary storage device and is respectively associated with each waveform data item; a waveform group retrieval process that retrieves the plurality of waveform data items that represent the musical tone from the primary storage device, the waveform group retrieval process retrieving a waveform data item or waveform data items, among the plurality of waveform data items, that have the same segment group information as a group; and a writing process that writes, as a single group, the waveform data item or waveform data items, among said plurality of waveform data items, that have the same segment group information onto one of prescribed storage segments that are storage regions of prescribed sizes in the secondary storage device.

In another aspect, the present disclosure provides a non-transitory computer-readable storage medium having stored therein a program executable by a processor in a device for reading waveform data of a musical tone from a primary storage device and transferring the read waveform data to a secondary storage device for tone reproduction, the program causing the processor to perform the following processes: a segment group information retrieval process that retrieves, for each waveform data item of a plurality of waveform data items that represent a musical tone stored in the primary storage device, segment group information that is also stored in the primary storage device and is respectively associated with each waveform data item; a waveform group retrieval process that retrieves the plurality of waveform data items that represent the musical tone from the primary storage device, the waveform group retrieval process retrieving a waveform data item or waveform data items, among the plurality of waveform data items, that have the same segment group information as a group; and a writing process that writes, as a single group, the waveform data item or waveform data items, among said plurality of waveform data items, that have the same segment group information onto one of prescribed storage segments that are pre-defined storage regions of prescribed sizes in the secondary storage device.

It is to be understood that both the foregoing general description and the following detailed description are exemplary and explanatory, and are intended to provide further explanation of the invention as claimed.

BRIEF DESCRIPTION OF THE DRAWINGS

The detailed descriptions below are intended to be read with reference to the following figures in order to gain a deeper understanding of the present application.

FIGS. 4A and 4B illustrate examples of data configurations for a flash memory tone information table and a tone selection priority table.

FIGS. 5A to 5C illustrate an operation for transferring waveform data for each tone from a high-capacity flash memory to a waveform memory.

FIG. 7 illustrates an example of a constant data structure that is stored in ROM.

FIG. 8 illustrates an example of variable data that is stored in ROM.

DETAILED DESCRIPTION OF EMBODIMENTS

An embodiment of the present invention (hereinafter, "the present embodiment") will be described in detail below with reference to figures. The present embodiment relates to a musical note generator for use in an electronic keyboard, for example, that writes waveform data (hereinafter, "split waveforms") for each pitch or volume from a high-capacity primary storage device (such as flash memory) to a secondary storage device (such as a waveform memory constituted by RAM) in order to reproduce changes in tones in accordance with performance information such as pitch (key region) and volume (velocity: the speed at which a key is pressed). The musical note generator according to the present embodiment makes it possible provide an electronic musical instrument that can reliably write a new waveform when a tone for which the corresponding waveform is not currently present in the secondary storage device is selected and a new tone waveform needs to be written from the primary storage device into the secondary storage device, thereby making it possible to avoid inefficient states in which the desired waveform cannot be written even though amount of free space is far greater than the size of the waveform itself.

Figure 1:
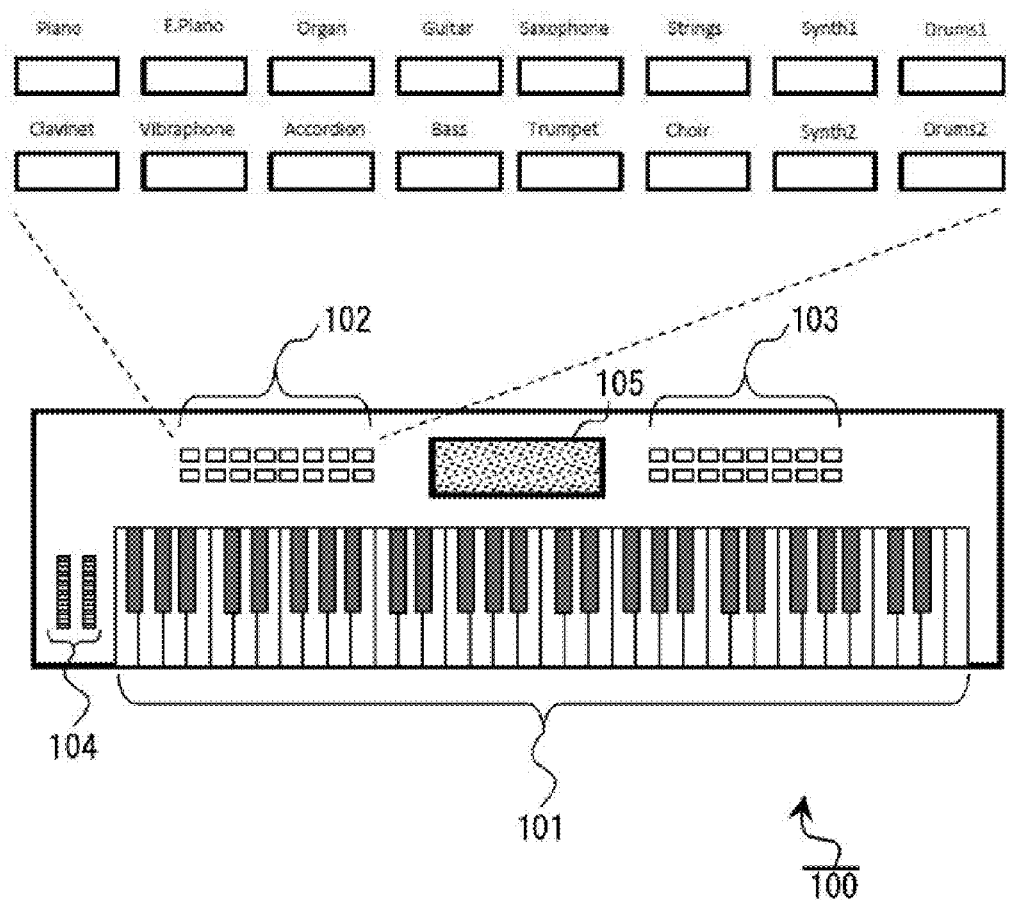
FIG. 1 is an external view of an embodiment of an electronic keyboard according to the present invention.

FIG. 1 is an external view of an embodiment of an electronic keyboard according to the present invention. The present embodiment is implemented as an electronic keyboard 100. The electronic keyboard 100 includes: a keyboard 101 that includes a plurality of keys (performance controls); a switch panel that includes tone selection buttons (tone selection controls) 102 for selecting tones and feature selection buttons 103 for selecting various features other than tone; bender/modulation wheels 104 that add various types of modulation (performance effects) such as pitch bend, tremolo, and vibrato; a liquid crystal display (LCD) 105 that displays the tone as well as various settings other than the tone; and the like. The electronic keyboard 100 also includes, in a location such as the rear face, side faces, or back face thereof, speakers (not illustrated in the figure) that emit the musical notes played during the performance.

As illustrated in FIG. 1, the tone selection buttons 102 are a group of buttons for selecting various categories of tones, such as the tones of a piano ("Piano" in the figure), an electronic piano ("E. Piano" in the figure), an organ ("Organ" in the figure), or a guitar ("Guitar" in the figure). The user can press these tone selection buttons 102 to select any tone from among 16 tones, for example.

Figure 2:
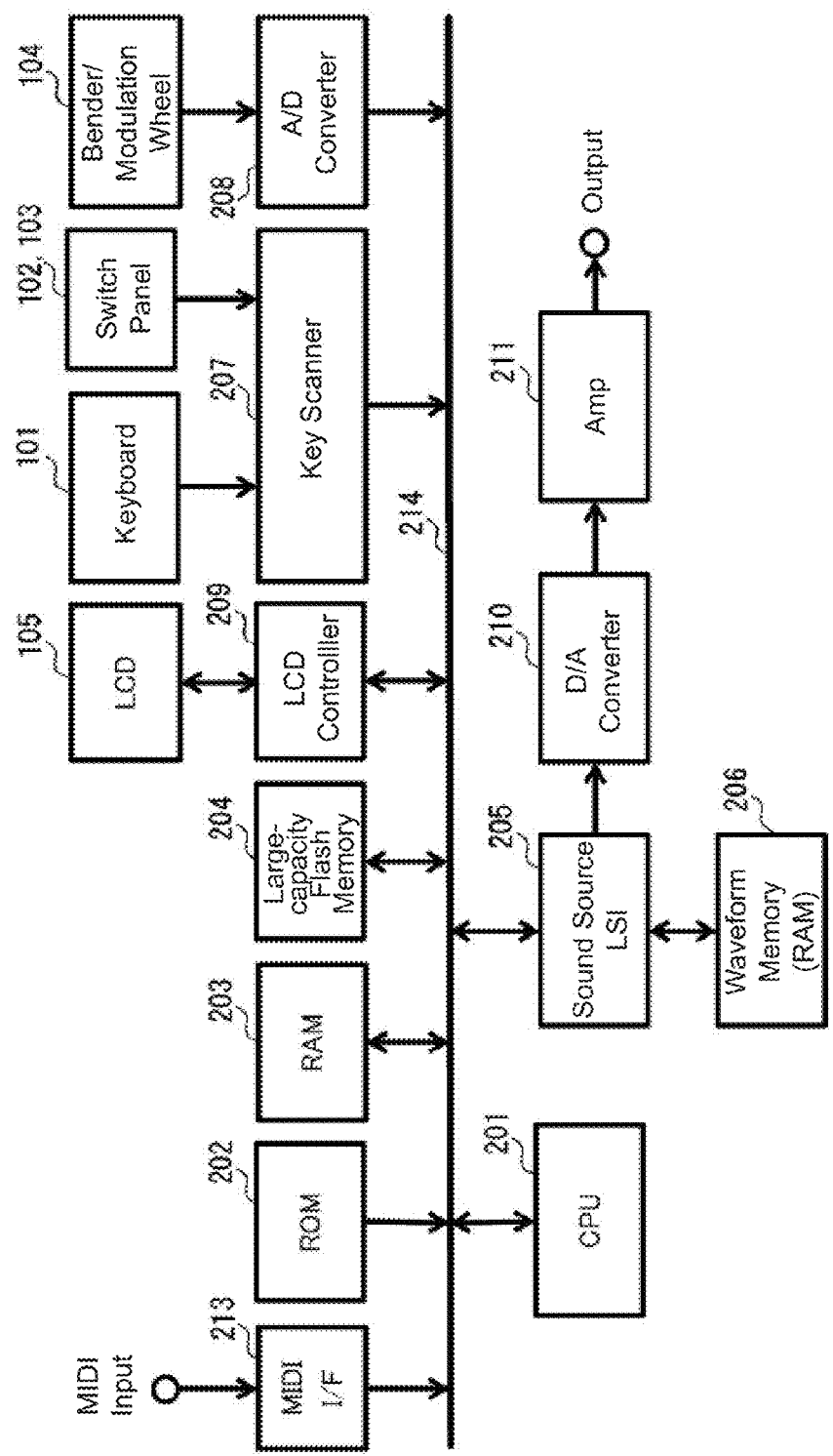
FIG. 2 illustrates an example of a hardware configuration for the embodiment of the electronic keyboard.

FIG. 2 illustrates an example of a hardware configuration for the embodiment of the electronic keyboard 100 illustrated in FIG. 1. As illustrated in FIG. 2, the electronic keyboard 100 has a configuration in which a central processing unit (CPU) 201, a read-only memory (ROM) 202, a random-access memory (RAM) 203, a high-capacity flash memory 204, a sound source large-scale integrated circuit (LSI) 205 that is connected to a waveform memory 206, a key scanner 207 that is connected to the keyboard 101 of FIG. 1 as well as to the switch panel of FIG. 1 that includes the tone selection buttons 102 and the feature selection buttons 103, an A/D converter 208 that is connected to the bender/modulation wheels 104 of FIG. 1, an LCD controller 209 that is connected to the LCD 105 of FIG. 1, and a Musical Instrument Digital Interface interface (MIDI I/F) 213 for receiving MIDI input are each connected to a system bus 214. Furthermore, digital musical note waveform data output from the sound source LSI 205 is converted to an analog musical note waveform signal by a D/A converter 210, which is then amplified by an amplifier 211 and output from a speaker or an output terminal (not illustrated in the figure).

The CPU 201 controls the operation of the electronic keyboard 100 illustrated in FIG. 1 by executing control programs stored in the ROM 202 while using the RAM 203 as working memory. The ROM 202 stores these control programs as well as various types of static data.

The high-capacity flash memory 204 (a primary storage device) provides a storage region for large amounts of data such as the waveform data for a plurality of tones and is accessed sequentially by a sequential access process. Meanwhile, the sound source LSI 205 is connected to the waveform memory 206 (a secondary storage device) that is constituted by RAM that stores waveform data. The waveform data for the musical notes to be emitted must be stored in this waveform memory 206. The CPU 201 sequentially reads, from the high-capacity flash memory 204, one or more sets of waveform data corresponding to the tone specified by a user with the tone selection buttons 102 illustrated in FIG. 1 and then transfers that data via the sound source LSI 205 to the waveform memory 206 to make it possible to replace any tone data that is currently stored therein.

The LCD controller 209 is an integrated circuit (IC) that controls the LCD 105. The key scanner 207 is an IC that scans the state of the keyboard 101 and components of the switch panel such as the tone selection buttons 102 and the feature selection buttons 103 and then notifies the CPU 201 of these states. The A/D converter 208 is an IC that detects the operation position of the bender/modulation wheels 104.

Next, an overview of the basic operation of the embodiment of the electronic keyboard 100 configured as described above will be provided.

First, a user interface will be described. In the electronic keyboard 100 according to the present embodiment, the user can press the tone selection buttons 102 illustrated in FIG. 1 in order to select a tone from among 16 tones, for example, and can then play music using that tone.

Figure 3:
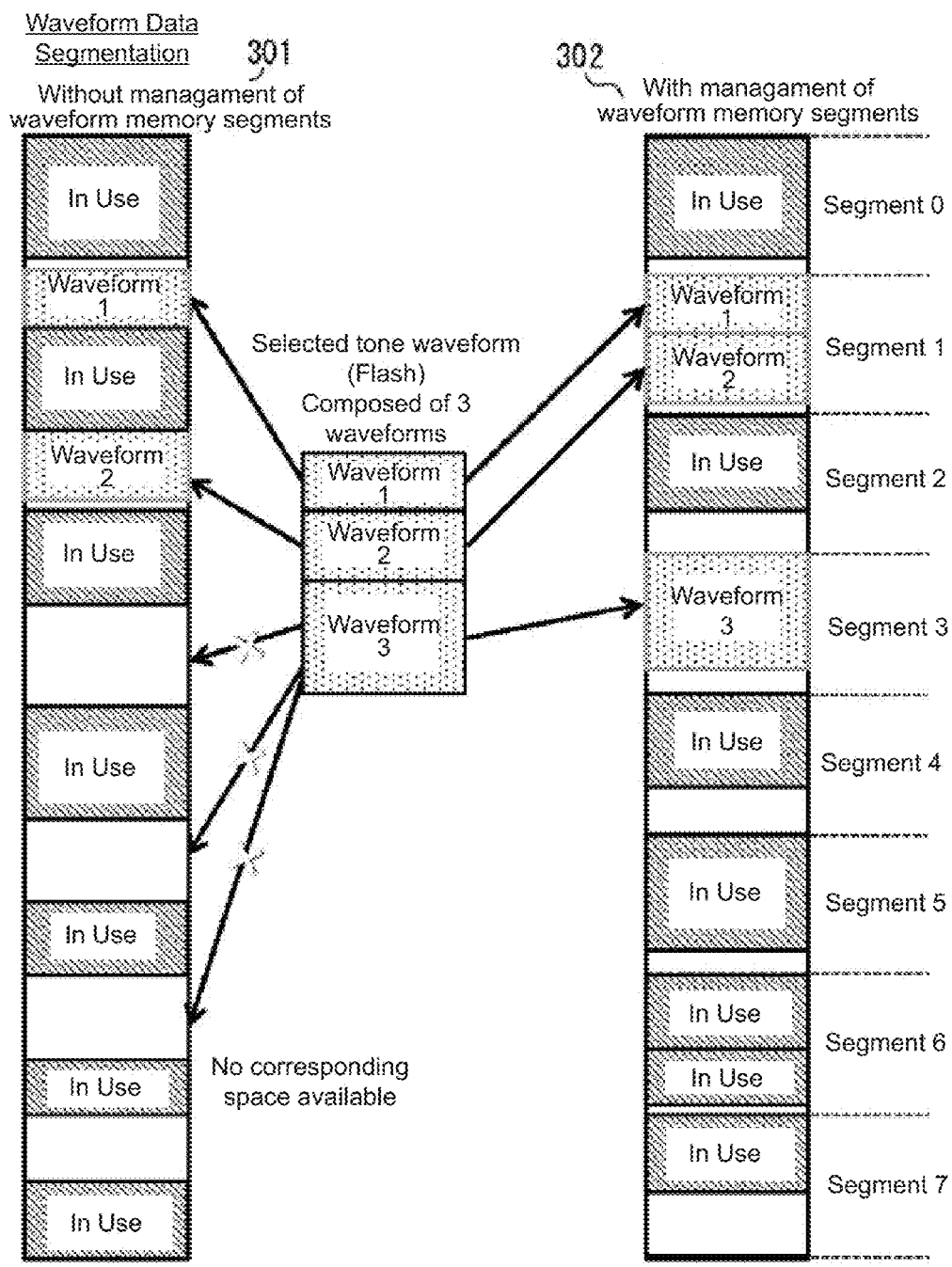
FIG. 3 illustrates the concept of waveform data segments in the embodiment.

Next, an operation for writing and transferring waveform data will be described. FIG. 3 illustrates the concept of waveform data segments in the present embodiment. As illustrated in the data placement scheme 301 for a conventional electronic keyboard that does not manage segments in waveform memory (RAM), the in-use regions and the free regions get placed irregularly as waveform data is repeatedly written, and therefore there are cases in which it is not possible to allocate a region to which to write new data even when the total amount of free space is sufficient just because that free space is not sequential.

In contrast, the present embodiment utilizes the data placement scheme 302. In this data placement scheme, boundary lines that data is not allowed to span across are established at a prescribed interval within the storage region of the waveform memory 206. In the present embodiment, the regions between adjacent boundary lines will be referred to as "segments." All of the segments each have the same data size, which is set to a value greater than the size of the largest waveform among the one or more waveforms included in each tone. In the present embodiment, the process of writing waveform data from the high-capacity flash memory 204 to the waveform memory 206 is implemented using these segments as the basic unit of storage. In the present embodiment, a single tone may include a single waveform or a plurality of waveforms. When writing the one or more waveforms for a given tone, a storage region of one or more segments in size is allocated in the waveform memory 206 (a segment allocation process), and then the waveforms are written. In this case, the allocated segments do not necessarily need to be sequential. Moreover, although a plurality of waveforms for the same tone can be written to a single segment, a control process is implemented to prevent a combination of waveforms for different tones from being written to a single segment.

A total of 16 tones' worth of groups of waveform data, for example, are stored in the high-capacity flash memory 204. The one or more waveforms included in the tone among those tones that is specified by the user are then written to the waveform memory 206 of the sound source LSI 205 so that the corresponding sounds can be emitted. This tone information is managed using a flash memory tone information table that is stored in the ROM 202 illustrated in FIG. 2. FIG. 4A illustrates an example of a data configuration for this flash memory tone information table. As shown in the first row of the table in FIG. 4A, for each of the tone entries shown in the second and subsequent rows in the example of the flash memory tone information table illustrated in the table in FIG. 4A, the following values are stored: a "number" value that represents the tone number, a "tone name" value, a "waveform address offset" value that represents an offset (as a hexadecimal number) of the storage address for that tone from the starting address of the waveform storage region in the high-capacity flash memory 204, a "waveform size" value that represents the total size (as a hexadecimal number) of the group of waveforms included in that tone, and a "number of segments used" value that represents the number of segments that must be used for that group of waveform data.

Each of the 16 tones includes a maximum of 64 waveforms, for example, which are stored sequentially in the high-capacity flash memory 204. The waveforms included in a tone are grouped together into groups of one or more waveforms according to whether they can be transferred into a single segment in the waveform memory 206. Any waveforms that are transferred to a single segment in the waveform memory 206 are always sequential in the high-capacity flash memory 204. The waveforms for a single tone are managed using a tone waveform information table that is stored in the ROM 202 illustrated in FIG. 2. FIG. 4B illustrates an example of a data configuration of a tone waveform information table that can manage up to 64 waveforms for a single tone. As shown in the first row of the table in FIG. 4B, for each of the waveform entries shown in the second and subsequent rows in the example of the tone waveform information table illustrated in the table in FIG. 4B, a "waveform number" value of 0 to 63 is stored. Moreover, a "minimum velocity" value, a "maximum velocity" value, a "minimum key number" value, and a "maximum key number" value are also stored as information (split zone parameters) for determining which waveform to load and emit according to the keys pressed and velocity (strength) of those keypresses when music is played. In addition, the following values are stored as well: an "address relative to segment start" value that represents the starting address of the waveform in the segment of the waveform memory 206 to which that waveform was transferred, and a "waveform size" value that represents the size of that waveform. Note that the "H" appended to the right sides of the values in the table indicate that those values are hexadecimal numbers. Finally, a "segment group" value that represents to which group the waveform belongs is also stored for each entry.

In the present embodiment, if the group of waveforms included in the tone specified by the user are not stored in the waveform memory 206, the following control process is executed. First (in the segment allocation process), the control process searches for and allocates, in units of segments and in the waveform memory 206, a free region equal in size to the number of segments required to store the one or more groups of waveforms included in the tone to be newly written from the high-capacity flash memory 204 to the waveform memory 206. Here, the required number of segments is determined by referencing the "number of segments used" value for the entry corresponding to the specified tone in the flash memory tone information table stored in the ROM 202 and illustrated in FIG. 4A. If the waveform memory 206 does not currently have the required number of free segments available, the control process sequentially frees the segments corresponding to other tones in order by oldest first until the required number of segments can be allocated.

Next, the group of waveforms corresponding to the specified tone and stored in the high-capacity flash memory 204 is sequentially transferred to the free segments allocated in the waveform memory 206. Here, groups of waveforms that have the same "segment group" values in the tone waveform information table (illustrated in FIG. 4B) that corresponds to the specified tone and is stored in the ROM 202 are transferred (in order starting from the smallest "segment group" value (0)) to respective free segments in the waveform memory 206 (in order starting from the smallest segment number). FIGS. 5A to 5C illustrate the operation for transferring waveform data for each tone from the high-capacity flash memory 204 to the waveform memory 206. For example, when transferring a group of waveforms 0 to 10 that are stored in the high-capacity flash memory 204 for the Guitar tone as illustrated in FIG. 5A to the waveform memory 206 illustrated in FIG. 5B, the group of the three sequential waveforms 0 to 2 for which the "segment group" value is 0 are transferred to the free segment Seg0 in the waveform memory 206 illustrated in FIG. 5B, the group of the three sequential waveforms 3 to 5 for which the "segment group" value is 1 are transferred to the free segment Seg4 in the waveform memory 206, the group of the three sequential waveforms 6 to 8 for which the "segment group" value is 2 are transferred to the free segment Seg6 in the waveform memory 206, and then the group of the two sequential waveforms 9 and 10 for which the "segment group" value is 3 are transferred to the free segment Seg63 in the waveform memory 206. Meanwhile, when transferring a group of waveforms 0 to 8 that are stored in the high-capacity flash memory 204 for the Saxophone tone as illustrated in FIG. 5C to the waveform memory 206 illustrated in FIG. 5B, for example, the group of the three sequential waveforms 0 to 2 for which the "segment group" value is 0 are transferred to the free segment Seg2 in the waveform memory 206 illustrated in FIG. 5B, the group of the three sequential waveforms 3 to 5 for which the "segment group" value is 1 are transferred to the free segment Seg3 in the waveform memory 206, the group of the two sequential waveforms 6 and 7 for which the "segment group" value is 2 are transferred to the free segment Seg5 in the waveform memory 206, and then the group of the single waveform 8 for which the "segment group" value is 3 is transferred to the free segment Seg7 in the waveform memory 206. The associations between the transfer destination segments and the "segment group" values of the waveforms transferred to those segments are stored in the RAM 203 (see FIG. 2), for example.

As described above, each segment has a size large enough to store the largest waveform, such as 100000H (where the "H" indicates that this is a hexadecimal number) bytes=1 megabyte (MB), for example. This guarantees that a waveform can always be transferred to the storage region provided by a single segment. Moreover, when the total size of several sequential waveforms that have the same "segment group" value is less than or equal to 1 MB, for example, all of those waveforms can be transferred to a single segment. This prevents the possibility of situations in which a waveform of a far smaller size than the total amount of free space that is currently available cannot be written.

If the group of waveforms included in the tone that was specified by the user is already stored in the waveform memory 206, then that group of waveforms does not need to be re-written from the high-capacity flash memory 204, and therefore the waveforms can simply be used as-is in a sound emission process. In this case, although no write operation occurs, the specified tone is stored as the newest tone in tone history.

Figure 6:
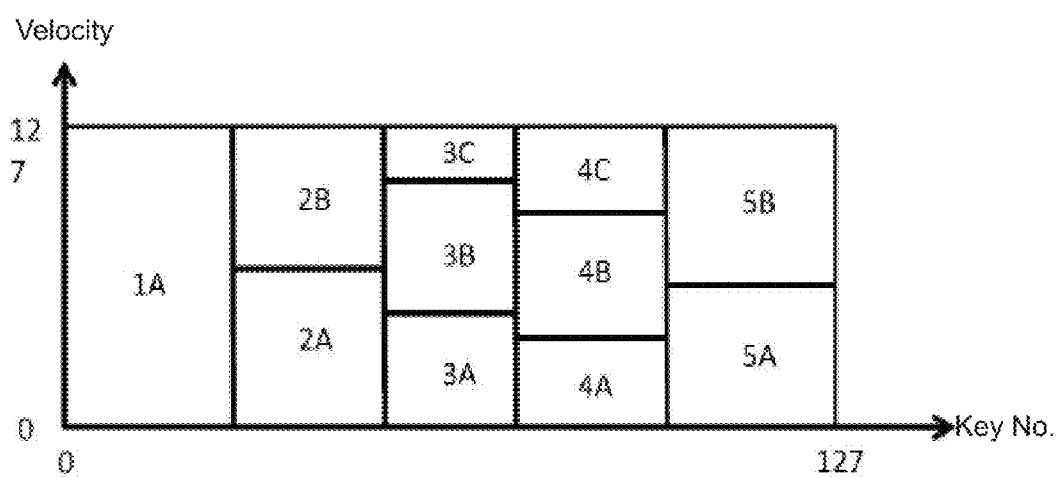
FIG. 6 illustrates how a waveform is split up.

FIG. 6 illustrates how a waveform is split up in the sound emission process that is executed when a keypress occurs. As illustrated in FIG. 6, in the present embodiment, the key number and velocity (keypress strength) used when keys are pressed are used to divide a two-dimensional area into up to 64 regions, and the 1 to 64 waveforms transferred to the waveform memory 206 for a single tone as described above are respectively assigned to these divided regions (split areas). When the CPU 201 illustrated in FIG. 2 detects via the key scanner 207 that a keypress has occurred on the keyboard 101, the CPU 201 searches, among the entries in the tone waveform information table (illustrated in FIG. 4B) that is stored in the ROM 202 and corresponds to the tone currently being used to play music, for the entry for which the key number of the keypress is bounded by the "minimum key number" value and the "maximum key number" value and for which the velocity of the keypress is bounded by the "minimum velocity" value and the "maximum velocity" value. Then, the waveform of the size corresponding to the "waveform size" value of the found entry starting from the address corresponding to the "address relative to segment start" value of that entry in the segment in the waveform memory 206 that is associated with the same segment group value as the "segment group" value of that entry is read at a speed corresponding to the key number of the keypress and then emitted at a strength corresponding to the velocity of the keypress.

If the group of waveforms included in the tone that was specified by the user are not currently stored in the waveform memory 206, the CPU 201 transfers that group of waveforms from the high-capacity flash memory 204 to the waveform memory 206. However, this waveform transfer process is executed as a background process that transfers each waveform one at a time. Therefore, when the CPU 201 determines the split area when a keypress occurs and instructs the sound source LSI 205 to read the waveform corresponding to that area from the waveform memory 206, if that waveform is currently being transferred from the high-capacity flash memory 204 to the waveform memory 206, the sound source LSI 205 does not emit any sound because that waveform is not yet present in the waveform memory 206.

The example of the flash memory tone information table illustrated in FIG. 4A and the example of the tone waveform information table illustrated in FIG. 4B that are stored in the ROM 202 (see FIG. 2) can be accessed as structures of constant data by the control program executed by the CPU 201 (see FIG. 2). FIG. 7 illustrates an example of a constant data structure that is stored in the ROM 202.

First, the flash memory tone information table illustrated in FIG. 4A is constructed using the following data that is illustrated in FIG. 7: a TONE_INF[16] structure (where the number in the brackets is an index), a NAME[16] array constant that is a member constant of that structure (where the number in the brackets is an index), a WAVE_TOTAL_SIZE constant, and a NUM_SEG constant. The TONE_INF[16] structure is accessed in the format TONE_INF[T], where T is a variable stored in the RAM 203 (see FIG. 2), for example. By allowing the variable T to take a value from 0 to 15, for example, the "number" values of 0 to 15 for each tone entry in the flash memory tone information table illustrated in FIG. 4A can be specified. The NAME[16] member constant stores a tone display name of up to 16 characters in length that corresponds to the "tone name" value in the example of the table illustrated in FIG. 4A. This member constant is accessed in the format TONE_INF[T].NAME[i], where i is a variable stored in the RAM 203, for example. By allowing the variable i to take a value from 0 to 15, for example, a tone display name (from a 0th character to a 15th character) that corresponds to the value of the variable T can be displayed, for example. The WAVE_TOTAL_SIZE member constant stores the total size of the waveforms in a tone, which corresponds to the "waveform size" value in FIG. 4A. This member constant is accessed in the format TONE_INF[T].WAVE_TOTAL_SIZE, for example. This constant gives the total size of the waveforms in the tone that corresponds to the value of the variable T. The NUM_SEG member constant stores the number of segments used by the waveforms in a tone, which corresponds to the "number of segments used" value in FIG. 4A. This member constant is accessed in the format TONE_INF[T].NUM_SEG, for example. This constant gives the number of segments used by the waveforms in the tone that corresponds to the value of the variable T.

Next, the tone waveform information table illustrated in FIG. 4B is constructed using the following data that is illustrated in FIG. 7: a TONE_INF[16] higher-order structure (where the number in the brackets is an index); a WAVE[64] middle-order structure that is a member structure of that higher-order structure (where the number in the brackets is an index); constants VEL_LO, VEL_HI, KEY_LO, KEY_HI, FLASH_ADRS, SEG_ADRS, SIZE, and SEG_GROUP that are member constants of that middle-order structure; and a TG_INF lower-order structure. The TONE_INF[16] higher-order structure is the same as described above. The WAVE[64] middle-order structure is accessed in the format WAVE[w], where w is a variable stored in the RAM 203 (see FIG. 2), for example. By allowing the variable w to take a value from 0 to 63, for example, the "waveform number" values of 0 to 63 for each waveform entry in the tone waveform information table illustrated in FIG. 4B can be specified. The VEL_LO and VEL_HI member constants correspond to the "minimum velocity" value and the "maximum velocity" value in FIG. 4B, respectively, and store the original minimum velocity and maximum velocity values of the range used when emitting the waveform. These member constants are accessed in the format TONE_INF[T].WAVE[w].VEL_LO and TONE_INF[T].WAVE[w].VEL_HI, for example. These constants thus give the minimum velocity and maximum velocity of the waveform corresponding to the value of the variable w for the tone corresponding to the value of the variable T. The KEY_LO and KEY_HI member constants correspond to the "minimum key number" value and the "maximum key number" value in FIG. 4B, respectively, and store the original minimum key number and maximum key number values of the range used when emitting the waveform. These member constants are accessed in the format TONE_INF[T].WAVE[w].KEY_LO and TONE_INF[T].WAVE[w].KEY_HI, for example. These constants thus give the minimum key number and maximum key number of the waveform corresponding to the value of the variable w for the tone corresponding to the value of the variable T. The FLASH_ADRS member constant is not illustrated in FIG. 4B but stores the starting address of a waveform in the high-capacity flash memory 204. This member constant is accessed in the format TONE_INF[T].WAVE[w].FLASH_ADRS, for example. This constant gives the starting address in the high-capacity flash memory 204 of the waveform corresponding to the value of the variable w for the tone corresponding to the value of the variable T. The SEG_ADRS member constant corresponds to the "address relative to segment start" value in FIG. 4B and stores an offset of the address of a waveform from the starting address of the segment in the waveform memory 206 to which the waveform will be written. This member constant is accessed in the format TONE_INF[T].WAVE[w].SEG_ADRS, for example. This constant gives the offset, from the starting address of the segment in the waveform memory 206 to which the waveform will be written, of the address of the waveform corresponding to the value of the variable w for the tone corresponding to the value of the variable T. The SIZE member constant corresponds to the "waveform size" value in FIG. 4B and stores the size of a waveform. This member constant is accessed in the format TONE_INF[T].WAVE[w].SIZE, for example. This constant gives the size of the waveform corresponding to the value of the variable w for the tone corresponding to the value of the variable T. If TONE_INF[T].WAVE[w].SIZE=0, this indicates that the specified waveform does not exist. The SEG_GROUP member constant corresponds to the "segment group" value in FIG. 4B and stores the segment group value assigned to a segment when waveforms are transferred to that segment in the waveform memory 206. This member constant is accessed in the format TONE_INF[T].WAVE[w].SEG_GROUP, for example. This constant gives the segment group value of the waveform corresponding to the value of the variable w for the tone corresponding to the value of the variable T. Waveforms that have the same TONE_INF[T].WAVE[w].SEG_GROUP values are transferred to the same segment in the waveform memory 206. The TG_INF member structure stores, as a structure of member constants (not illustrated in FIGS. 4A and 4B), various parameters used when the sound source LSI 205 (see FIG. 2) executes the sound emission process on a waveform that was transferred to a segment in the waveform memory 206. These parameters include the starting address from which the waveform is read, a loop address that represents a looping position, an ending address that represents an ending position, volume, tuning information, and the like, for example.

FIG. 8 illustrates a list of the primary variables that are stored in the RAM 203 and are used in the control process executed by the CPU 201 (see FIG. 2). The TIMESTAMP variable stores a history number that is incremented by 1 each time a tone selection event occurs when the user presses the tone selection buttons 102 (see FIG. 1). When segments are assigned, this value is stored in the SEG_INF[s].TIMESTAMP structure member variable (described later). The CUR_TONE variable stores the tone number of the tone that is currently selected for playing music. When this value is −1, this indicates that no tone is currently selected for playing music. The TRANSFER_WAVE variable stores the waveform number of the waveform that is currently being transferred in the background process. When this value is −1, this indicates that all of the waveforms have been transferred.

Next, the following information is stored for each of the segments in the waveform memory 206: a SEG_INF[64] structure (where the number in the brackets is an index); and TONE, SEG_GROUP, and TIMESTAMP member variables of that structure. The SEG_INF[64] structure is accessed in the format SEG_INF[s], where s is a variable stored in the RAM 203 (see FIG. 2), for example. By allowing the variable s to take a value from 0 to 63, for example, the 64 segments from segment 0 to segment 63 in the waveform memory 206 can be specified. The TONE member variable stores the tone number assigned to a segment. When this value is −1, this indicates that the segment is currently empty (not being used). This member variable is accessed in the format SEG_INF[s].TONE, for example. This variable gives the tone number assigned to the segment corresponding to the value of the variable s. The value of the variable T stored as the tone number in the RAM 203 when a waveform is transferred to the segment is copied to the TONE member variable. The SEG_GROUP member variable stores the segment group value within the tone assigned to a segment. This member variable is accessed in the format SEG_INF[s].SEG_GROUP, for example. This variable gives the segment group value within the tone assigned to the segment corresponding to the value of the variable s. The "segment group" value in the tone waveform information table (illustrated in FIG. 4B) that is stored in the ROM 202 and corresponds to the waveforms that are transferred to a segment (that is, the TONE_INF[T].WAVE[w].SEG_GROUP value in FIG. 7) is copied to the SEG_GROUP member variable. This will be referred to as a segment group information retrieval process. The TIMESTAMP member variable stores a history number used by a segment. This member variable is accessed in the format SEG_INF[s].TIMESTAMP, for example. This variable gives the history number used by the segment corresponding to the value of the variable s. The value of the TIMESTAMP variable that is incremented by 1 each time a tone selection event occurs when the user presses the tone selection buttons 102 (see FIG. 1) is copied this variable. Segments that were assigned at the same time have the same TIMESTAMP values.

Next, the following information related to the one or more waveforms stored in the segments in the waveform memory 206 is stored: the SEG_INF[64] higher-order structure (where the number in the brackets is an index); a WAVE_INF[64] middle-order structure that is a member structure of that higher-order structure (where the number in the brackets is an index); and member variables WAVE, WAVE_NUM, SEG_ADRS, and SIZE of that middle-order structure. The SEG_INF[64] higher-order structure is the same as described above. The WAVE_INF[64] middle-order structure is accessed in the format WAVE_INF[i], where i is a variable stored in the RAM 203 (see FIG. 2), for example. By allowing the variable i to take a value from 0 to 63, for example, the waveforms 0 to 63 stored in a segment can be specified. The WAVE member variable stores a value that indicates whether a waveform is present in a segment. When this value is 0, this indicates that the waveform is not present, and when this value is 1, this indicates that the waveform is present (has been transferred). This member variable is accessed in the format SEG_INF[s].WAVE_INF[i].WAVE, for example. This variable indicates whether the waveform corresponding to the value of the variable i is present in the segment corresponding to the value of the variable s. The value of the WAVE member variable is set to 0 when an instruction to transfer the waveform to the segment is issued and is set to 1 when the background transfer of the waveform to the segment is complete. The WAVE_NUM member variable stores the waveform number of the waveform (within the current tone) that is stored in the segment. When this value is −1, this indicates that the waveform has not yet been assigned. This member variable is accessed in the format SEG_INF[s].WAVE_INF[i].WAVE_NUM, for example. This variable gives the waveform number of the waveform (within the current tone) corresponding to the value of the variable i in the segment corresponding to the value of the variable s. The SEG_ADRS member variable stores an address offset of a waveform in a segment. This member variable is accessed in the format SEG_INF[s].WAVE_INF[i].SEG_ADRS, for example. The "address relative to segment start" value in the tone waveform information table (illustrated in FIG. 4B) that is stored in the ROM 202 and corresponds to the waveforms that are transferred to a segment (that is, the TONE_INF[T].WAVE[w].SEG_ADRS value in FIG. 7) is copied to the SEG_ADRS member variable. The SIZE member variable stores the size of a waveform in a segment. This member variable is accessed in the format SEG_INF[s].WAVE_INF[i].SIZE, for example. The "waveform size" value in the tone waveform information table (illustrated in FIG. 4B) that is stored in the ROM 202 and corresponds to the waveforms that are transferred to a segment (that is, the TONE_INF[T].WAVE[w].SIZE value in FIG. 7) is copied to the SIZE member variable.

Next, the control process executed by the CPU 201 in order to implement the operations described above will be described using a detailed example.

Figure 9:
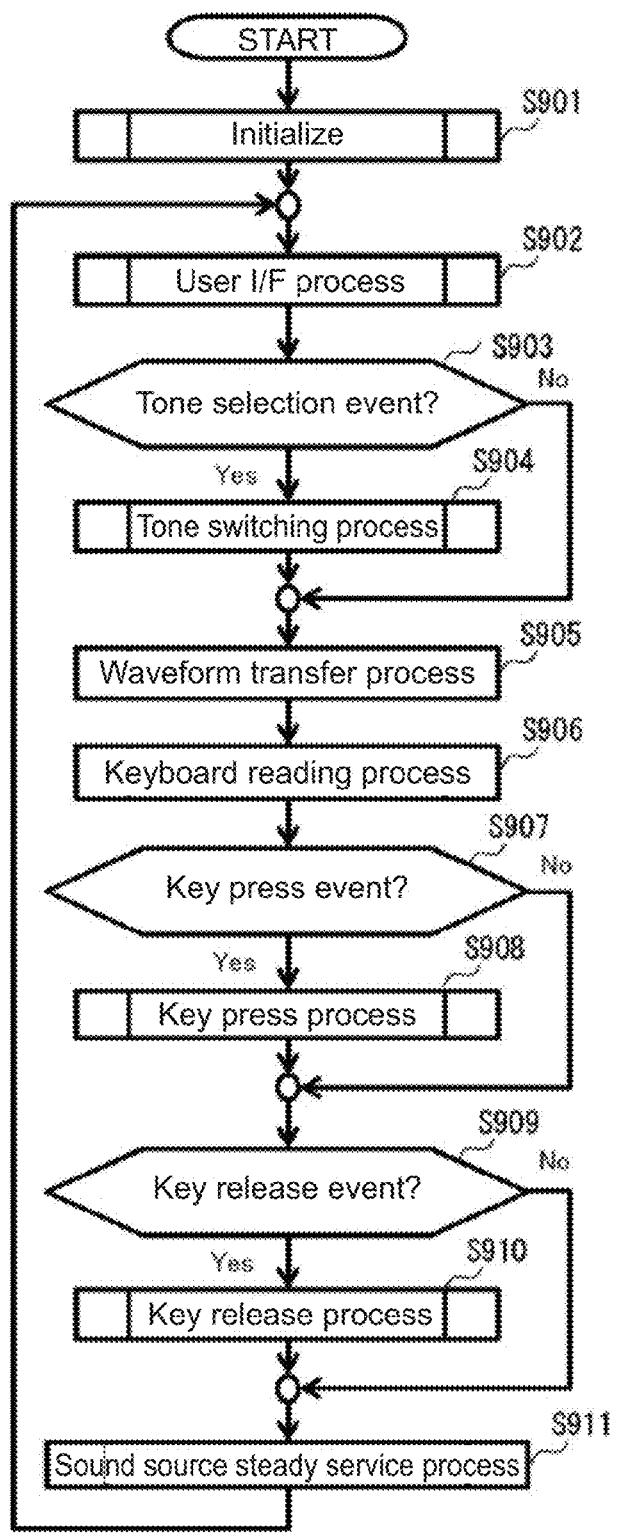
FIG. 9 is a flowchart of a main routine that illustrates an example of an overall control process.

FIG. 9 is a flowchart of a main routine that illustrates an example of the overall control process executed by the CPU 201. This example process is executed when the CPU 201 executes a control program that is stored in the ROM 202.

First, in step S901, the CPU 201 initializes the contents of the RAM 203, and then the CPU 201 enters a continuous loop that includes the sequence of processes in steps S902 to S911.

First, in step S902 of this continuous loop, the CPU 201 executes a user interface process ("user I/F" in the figure). Here, the CPU 201 gets the states of the tone selection buttons 102 illustrated in FIG. 1 from the key scanner 207 illustrated in FIG. 2.

Then, in step S903 (a specification process), the CPU 201 determines, according to the results of step S902, whether a tone selection event has occurred due to the user pressing any of the tone selection buttons 102.

If a tone selection event has occurred (the result of the determination in step S903 is Yes), the CPU 201 proceeds to step S904 and executes a tone switching process. If the result of the determination in step S903 is No, the CPU 201 skips the process in step S904.

Next, in step S905, the CPU 201 executes a waveform transfer process. Here, the CPU 201 executes a background process to transfer waveforms from the high-capacity flash memory 204 to the waveform memory 206 illustrated in FIG. 2.

Then, in step S906, the CPU 201 executes a keyboard reading process. Here, the CPU 201 gets the states of the keys of the keyboard 101 illustrated in FIG. 1 from the key scanner 207 illustrated in FIG. 2.

Next, in step S907, the CPU 201 determines, according to the results of step S906, whether a keypress event has occurred due to the user pressing any of the keys of the keyboard 101.

If a keypress event has occurred (the result of the determination in step S907 is Yes), the CPU 201 proceeds to step S908 and executes a keypress process. If the result of the determination in step S907 is No, the CPU 201 skips the process in step S908.

Then, in step S909, the CPU 201 determines, according to the results of step S906, whether a key release event has occurred due to the user releasing any of the keys of the keyboard 101 that had previously been pressed.

If a key release event has occurred (the result of the determination in step S909 is Yes), the CPU 201 proceeds to step S910 and executes a key release process. If the result of the determination in step S909 is No, the CPU 201 skips the process in step S910.

Next, in step S911, the CPU 201 executes a sound source regulation service process. Here, the CPU 201 executes various other typical processes of the electronic keyboard 100 such as a process for when the feature selection buttons 103 illustrated in FIG. 1 are pressed and a process for when the bender/modulation wheels 104 illustrated in FIG. 1 are used, for example.

Finally, the CPU 201 returns to step S902, which is the beginning of the continuous loop.

Figure 10:
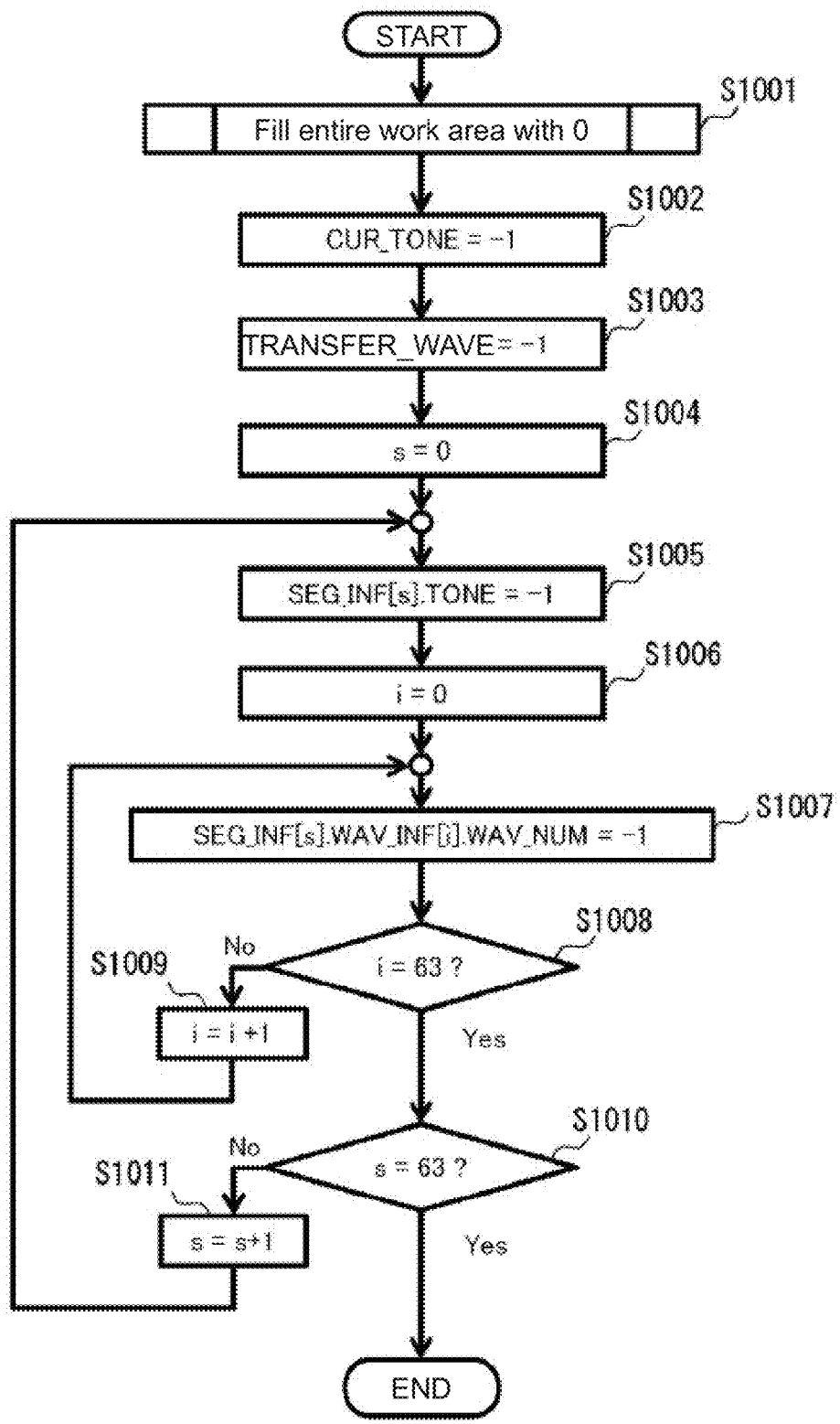
FIG. 10 is a flowchart illustrating a detailed example of an initialization process.

FIG. 10 is a flowchart illustrating a detailed example of the initialization process of step S901 in FIG. 9.

First, in step S1001, the CPU 201 sets of the values of all of the variables illustrated in FIG. 8 that are stored in the RAM 203 to 0.

Next, in step S1002, the CPU 201 stores, in the CUR_TONE variable (see FIG. 8) in the RAM 203 that stores the tone number of the tone that is currently selected for playing music, a value of −1 that indicates that no tone is currently selected.

Then, in step S1003, the CPU 201 stores, in the TRANSFER_WAVE variable in the RAM 203 that stores the waveform number of the waveform that is currently being transferred in the background process, a value of −1 that indicates that all of the waveforms have been transferred.

Next, in step S1004, the CPU 201 sets the variable s in the RAM 203 for counting the segments to an initial value of 0. The CPU 201 then repeatedly executes the processes in step S1005 to step S1009 while incrementing the value of s by 1 each time in step S1011 until it is determined in step S1010 that s is equal to 63.

First, in step S1005 of this repeated process, the CPU 201 stores, in the SEG_INF[s].TONE variable that stores the tone number that is assigned to the segment corresponding to the value of the variable s, a value of −1 that indicates that that segment is currently empty (not being used).

Next, in step S1006, the CPU 201 sets the variable i in the RAM 203 for counting the number of waveforms in a segment to an initial value of 0. The CPU 201 then repeatedly executes the process in step S1007 while incrementing the value of i by 1 each time in step S1009 until it is determined in step S1008 that i is equal to 63. In other words, in step S1007, the CPU 201 stores, in the SEG_INF[s].WAVE_INF[i].WAVE_NUM variable that stores the waveform number (within the tone) of the ith (the value of the variable i) waveform in the segment corresponding to the value of the variable s, a value of −1 that indicates that no waveforms have been assigned.

When the result of the determination in step S1010 eventually becomes Yes after these repeated processes are complete, the CPU 201 ends the initialization process of step S901 of FIG. 9 as illustrated in the flowchart in FIG. 10.

Figure 11:
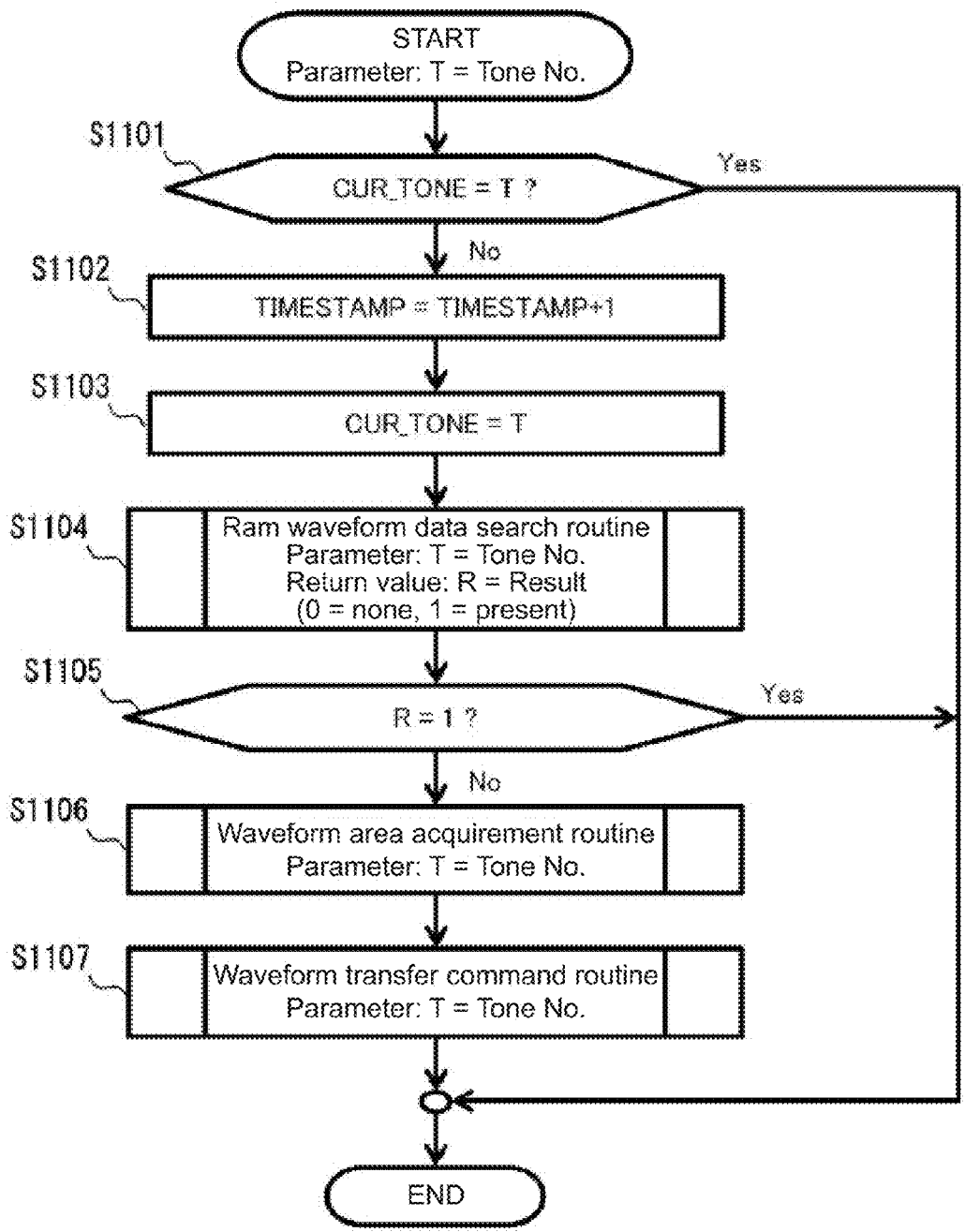
FIG. 11 is a flowchart illustrating a detailed example of a tone switching process.

FIG. 11 is a flowchart illustrating a detailed example of the tone switching process of step S904 in FIG. 9, which is executed when a tone selection event occurs (that is, when the result of the determination in step S903 is Yes). The value of the tone number variable T in the RAM 203 is passed to this process when executed. As described above, an initial value of 0 is stored in the tone number variable T when step S1001 of FIG. 10 is executed. When step S904 of FIG. 9 is executed, the tone number of the tone selected by the user as retrieved in the user interface process in step S902 of FIG. 9 in accordance with the user's operation of the tone selection buttons 102 illustrated in FIG. 1 is stored in the tone number variable T.

First, in step S1101 of the flowchart of the tone switching process illustrated in FIG. 11, the CPU 201 determines whether the value of the CUR_TONE variable that stores the tone number of the tone that is currently selected for playing music is equal to the new tone number that was specified by the user.

If the result of the determination in step S1101 is Yes, this means that the specified tone is already selected as the currently selected tone or that the waveforms for the specified tone are currently being transferred from the high-capacity flash memory 204 to the waveform memory 206, and therefore the CPU 201 immediately ends the tone switching process of step S904 of FIG. 9 as illustrated in the flowchart in FIG. 11.

If the result of the determination in step S1101 is No, the CPU 201 proceeds to step S1102 and increments the value of the TIMESTAMP variable that stores the history number by 1.

Next, in step S1103, the CPU 201 stores, in the CUR_TONE variable that stores the tone number of the tone that is currently selected for playing music, the new tone number value that was specified by the user.

Next, in step S1104 (a determination process), the CPU 201 executes a RAM waveform data scanning routine. Here, the CPU 201 passes the new specified tone number that is stored in the variable T in the RAM 203 to the routine as a parameter. In step S1104, the CPU 201 gets the result of the routine as a return value that indicates whether the waveforms included in the tone corresponding to the specified tone number are present in the waveform memory 206 (0 if the waveforms are not present, 1 if the waveforms are present) and stores that result in a variable R in the RAM 203. This process will be described in more detail later.

Next, in step S1105, the CPU 201 determines whether the value of the variable R is 1.

If the result of the determination in step S1105 is Yes, this means that the waveforms included in the tone corresponding to the specified tone number do not need to be newly transferred to the waveform memory 206, and therefore the CPU 201 immediately ends the tone switching process of step S904 of FIG. 9 as illustrated in the flowchart in FIG. 11.

If the result of the determination in step S1105 is No, the CPU 201 proceeds to step S1106 and executes a waveform region allocation routine. Here, the CPU 201 passes the new specified tone number that is stored in the variable T in the RAM 203 to the routine as a parameter. In this routine, the CPU 201 allocates the number of free segments in the waveform memory 206 that are needed to transfer the waveforms included in the tone corresponding to the specified tone number from the high-capacity flash memory 204. This process will be described in more detail later.

Next, in step S1107, the CPU 201 executes a waveform transfer instruction routine. Here, the CPU 201 passes the new specified tone number that is stored in the variable T in the RAM 203 to the routine as a parameter. In this routine, the CPU 201 executes a process for preparing to transfer the waveforms included in the tone corresponding to the specified tone number from the high-capacity flash memory 204 to the waveform memory 206 with the waveform transfer process of step S905 in FIG. 9.

Figure 12A:
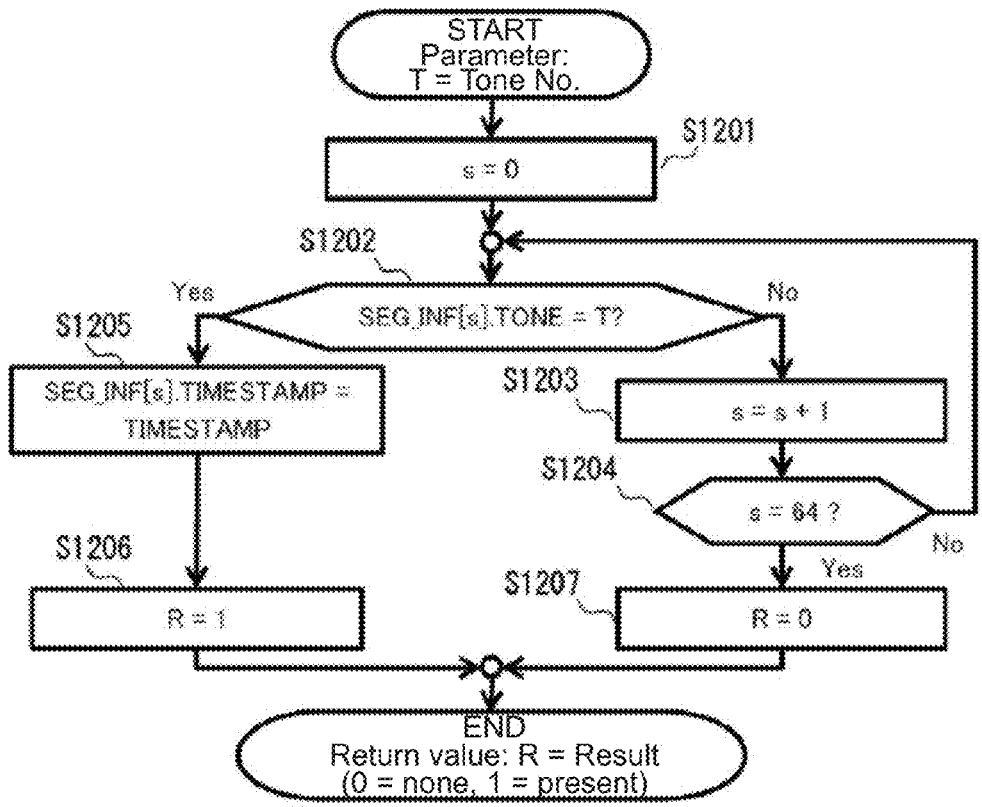
FIGS. 12A and 12B contain flowcharts that illustrate detailed examples of a RAM waveform data scanning routine and a waveform region allocation routine.

FIG. 12A is a flowchart illustrating a detailed example of the RAM waveform data scanning routine of step S1104 in FIG. 11.

First, in step S1201, the CPU 201 resets the variable s in the RAM 203 for counting the segments to scan.

Next, in step S1202, the CPU 201 determines whether the value of the SEG_INF[s].TONE variable (see FIG. 8) in the RAM 203 that stores the tone number assigned to the segment corresponding to the value of the variable s is equal to the value of the variable T in the RAM 203 that stores the new specified tone number value that was passed in as a parameter.

If the result of the determination in step S1202 is No, the CPU 201 repeats the determination process in step S1202 for the segment specified by the variable s while incrementing the value of the variable s by 1 each time in step S1203 until it is determined in step S1204 that the value of the variable s is equal to 64 (that is, the CPU 201 proceeds to step S1203, and then if the result of the determination in step S1204 is No, the CPU 201 returns to step S1202 and then proceeds to step S1203 again, and so on).

If the result of the determination in step S1202 becomes Yes while the processes in steps S1202 to S1204 are being repeated, the CPU 201 proceeds to step S1205 and stores, in the SEG_INF[s].TIMESTAMP variable that stores the history number used by the segment corresponding to the value of the variable s, the value of the TIMESTAMP variable in the RAM 203 that was incremented in accordance with the current tone selection event (see step S1102 in FIG. 11) in order to update the history number for the corresponding segment.

Next, in step S1206, because it has been determined that the waveforms included in the tone corresponding to the tone number that was set for the segment corresponding to the variable s, the CPU 201 stores a return value of 1 in the variable R in the RAM 203 (which indicates that the waveforms included in the tone corresponding to the specified tone number are present in the waveform memory 206). Then, the CPU 201 ends the RAM waveform data scanning routine of step S1104 of FIG. 11 as illustrated in the flowchart in FIGS. 12A and 12B.

While the processes in steps S1202 to S1204 are being repeated, if the result of the determination in step S1204 becomes Yes because the segment specified by the variable s is the last segment, it is determined that the waveforms included in the tone corresponding to the specified tone number are not stored in any of the segments, and therefore the CPU 201 proceeds to step S1207 and stores a return value of 0 in the variable R in the RAM 203 (which indicates that the waveforms included in the tone corresponding to the specified tone number are not present in the waveform memory 206). Then, the CPU 201 ends the RAM waveform data scanning routine of step S1104 of FIG. 11 as illustrated in the flowchart in FIG. 12A.

Figure 12B:
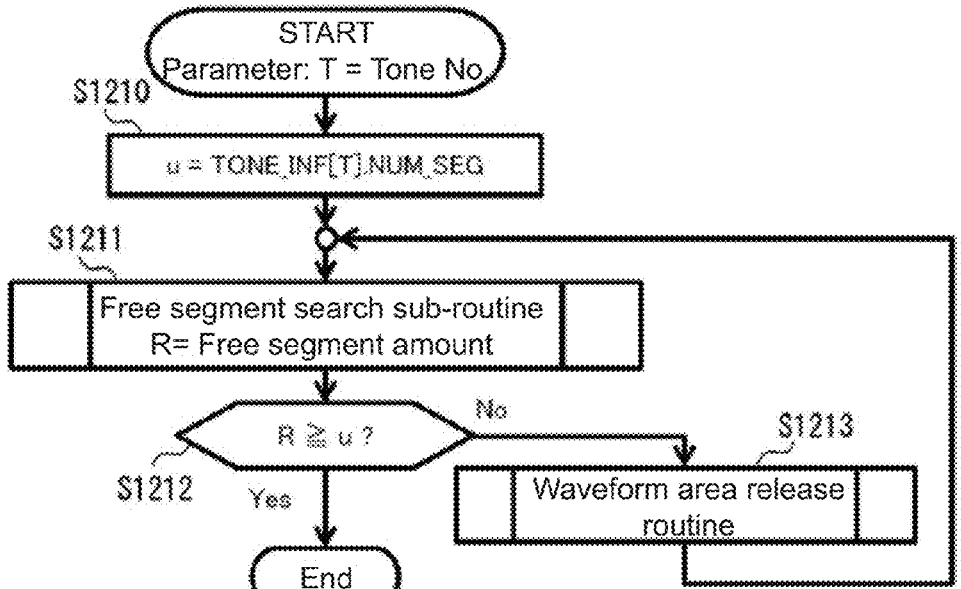

FIG. 12B is a flowchart illustrating a detailed example of the waveform region allocation routine of step S1106 in FIG. 11. As described above, this routine is executed when the RAM waveform data scanning routine of step S1104 in FIG. 11 determines that the waveforms included in the tone corresponding to the specified tone number are not present in any of the segments in the waveform memory 206.

First, in step S1210, the CPU 201 stores, in a variable u in the RAM 203, the value of the TONE_INF[T].NUM_SEG constant (see FIG. 7) that stores the number of segments used by the tone corresponding to the value of the variable T in the RAM 203, which stores the specified tone number and is passed to this routine as a parameter.

Next, the CPU 201 executes a free segment counting routine. This routine gets the number of free segments that are currently not being used in the waveform memory 206. In step S1211, the CPU 201 stores the number of free segments counted by this routine in a variable R in the RAM 203. This process will be described in more detail later.

Then, in step S1212, the CPU 201 determines whether the number of free segments stored in the variable R is greater than or equal to the number of segments used by the tone corresponding to the specified tone number that was stored in the variable u in step S1210.

If the result of the determination in step S1212 is No, the CPU 201 proceeds to step S1213 and executes a waveform region freeing routine. This routine frees the segments in the waveform memory 206 that are currently being used for the tone with the oldest history number. This process will be described in more detail later.

Then, the CPU 201 returns to step S1211, executes the free segment counting routine again, and then proceeds to step S1212 again and determines whether the number of free segments stored in the variable R has become greater than or equal to the number of segments used that was stored in the variable u in step S1210.

While the processes in step S1211 to step S1213 are being repeated as described above, if the result of the determination in step S1212 becomes Yes because the number of free segments stored in the variable R has become greater than or equal to the number of segments used by the tone corresponding to the specified tone number, this means that the required number of free segments have been allocated, and therefore the CPU 201 ends the waveform region allocation routine of step S1106 in FIG. 11 as illustrated in the flowchart in FIGS. 12A and 12B.

Figure 13:
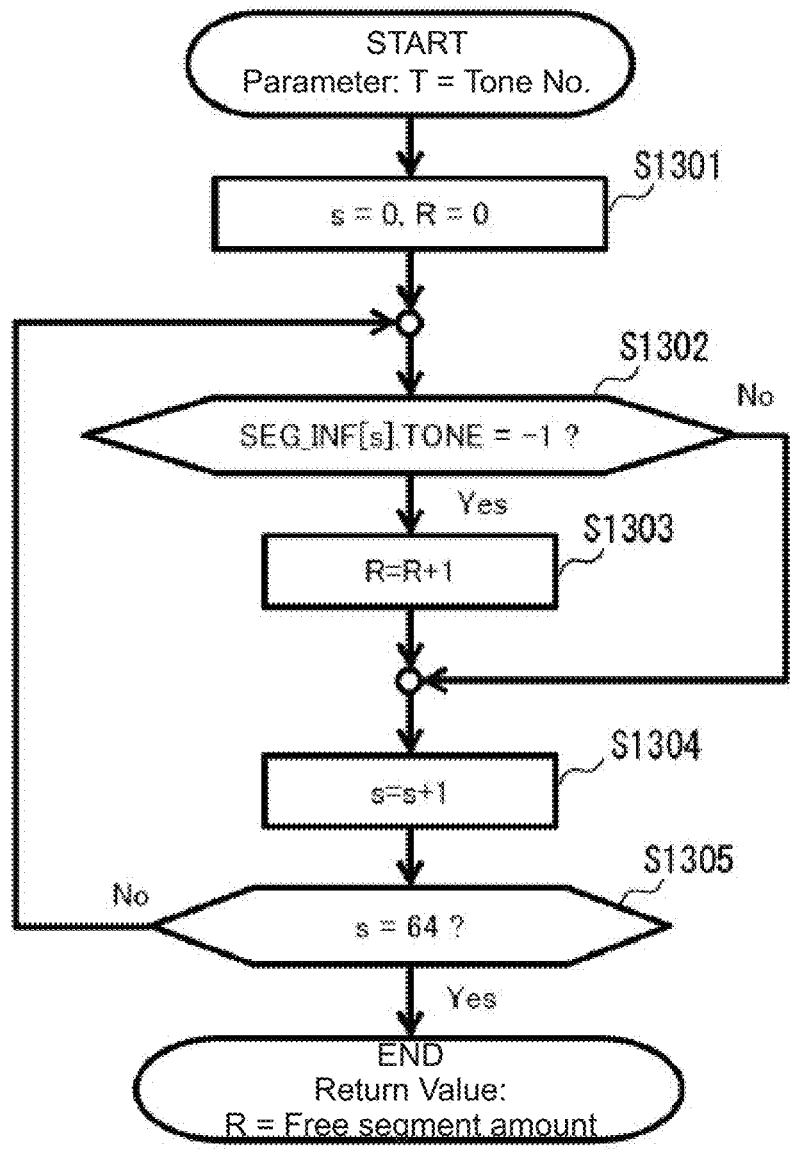
FIG. 13 is a flowchart illustrating a detailed example of a free segment counting routine.

FIG. 13 is a flowchart illustrating a detailed example of the free segment counting routine of step S1211 in FIGS. 12A and 12B. As described above, this routine gets the number of free segments in the waveform memory 206.

First, in step S1301, the CPU 201 resets the variable s in the RAM 203 for counting the segments to 0 and also resets the value of the variable R in the RAM 203 that stores the number of free segments (the return value) to 0.

Next, the CPU 201 repeats the processes in steps S1302 and S1303 for each segment specified by the value of the variable s while incrementing the value of the variable s by 1 each time in step S1304 until it is determined in step S1305 that the value of the variable s is equal to 64.

First, in step S1302 of this repeated process, the CPU 201 determines whether the value of the SEG_INF[s].TONE variable that stores the tone number that is assigned to the segment corresponding to the value of the variable s is equal to −1 (which indicates that that segment is currently empty (not being used)).

If the result of the determination in step S1302 is Yes because the segment is empty, the CPU 201 proceeds to step S1303 and increments the value of the variable R in the RAM 203 that stores the number of free segments (the return value) by 1.

If the result of the determination in step S1302 is No, the CPU 201 skips the process in step S1303.

When the result of the determination in step S1305 eventually becomes Yes after these repeated processes are complete, the CPU 201 ends the free segment counting routine of step S1211 of FIG. 11 as illustrated in the flowchart in FIG. 13. Once this routine is complete, the variable R in the RAM 203 stores the number of free segments in the waveform memory 206.

Figure 14:
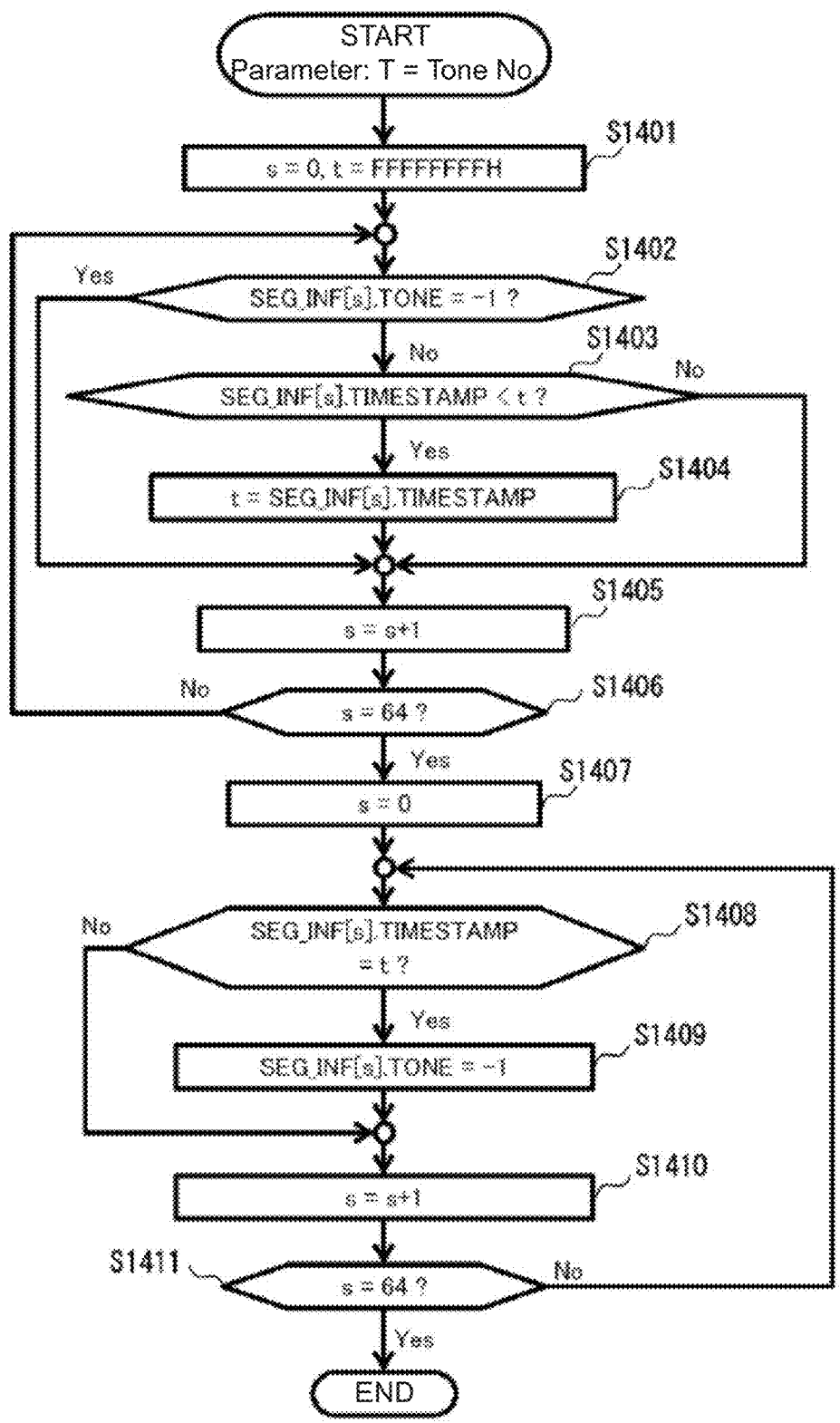
FIG. 14 is a flowchart illustrating a detailed example of a waveform region freeing routine.

FIG. 14 is a flowchart illustrating a detailed example of the waveform region freeing routine of step S1213 in FIG. 12B. As described above, this routine frees the segments in the waveform memory 206 that are currently being used for the tone with the oldest history number.

First, in step S1401, the CPU 201 resets the variable s in the RAM 203 for counting the segments to 0 and also sets a sufficiently large value (such as FFFFFFFFH, where the "H" at the end indicates that the preceding value is a hexadecimal number) to a variable t in the RAM 203 that stores a comparison history number.

Next, the CPU 201 repeats the sequence of processes in steps S1402 to S1404 for each segment specified by the value of the variable s while incrementing the value of the variable s by 1 each time in step S1405 until it is determined in step S1406 that the value of the variable s is equal to 64.

First, in step S1402 of this repeated process, the CPU 201 determines whether the value of the SEG_INF[s].TONE variable that stores the tone number that is assigned to the segment corresponding to the value of the variable s is equal to −1 (which indicates that that segment is currently empty (not being used)).

If the result of the determination in step S1402 is Yes, the CPU 201 proceeds to step S1405 and then repeats the process described above for the next segment.

If the result of the determination in step S1402 is No, the CPU 201 proceeds to step S1403 and determines whether the value of the SEG_INF[s].TIMESTAMP variable that stores the history number used by the segment corresponding to the value of the variable s is less than the value of the variable t in the RAM 203 that stores the comparison history number.

If the result of the determination in step S1403 is Yes, the CPU 201 proceeds to step S1404 and stores, in the variable t in the RAM 203 that stores the comparison history number, the value of the SEG_INF[s].TIMESTAMP variable that stores the history number used by the segment corresponding to the value of the variable s. As a result, the history number used when a tone was specified for the segment corresponding to the value of the variable s is stored in the variable t as the history number that is currently the oldest.

If the result of the determination in step S1403 is No, the CPU 201 skips the process in step S1404 and maintains the current value of the variable t.

Once the comparison of the history numbers of all of the segments in the repeating process described above is eventually complete and the result of the determination in step S1406 becomes Yes, the variable t stores the smallest (that is, the oldest) history number.

Next, the CPU 201 proceeds to step S1407 and resets the value of the variable s for counting the segments to 0. Then, in order to free the segment that has the oldest history number that is stored in the variable t, the CPU 201 repeats the processes in steps S1408 and S1409 for each segment specified by the value of the variable s while incrementing the value of the variable s by 1 each time in step S1410 until it is determined in step S1411 that the value of the variable s is equal to 64.

First, in step S1408 of this repeated process, the CPU 201 determines whether the value of the SEG_INF[s].TIMESTAMP variable that stores the history number used by the segment corresponding to the value of the variable s is equal to the oldest history number that is stored in the variable t.

If the result of the determination in step S1408 is Yes, the CPU 201 stores, in the SEG_INF[s].TONE variable that stores the tone number that is assigned to the segment corresponding to the value of the variable s, a value of −1 that indicates that that segment is currently empty (not being used). This frees the corresponding segment.

If the result of the determination in step S1408 is No, the CPU 201 skips the process in step S1409 and does not free the segment corresponding to the value of the variable s.

When the result of the determination in step S1411 eventually becomes Yes after this repeated process is complete, the CPU 201 ends the waveform region freeing routine of step S1213 of FIG. 12B as illustrated in the flowchart in FIG. 14. As a result, one or more segments that previously had the oldest history number are freed.

Figure 15:
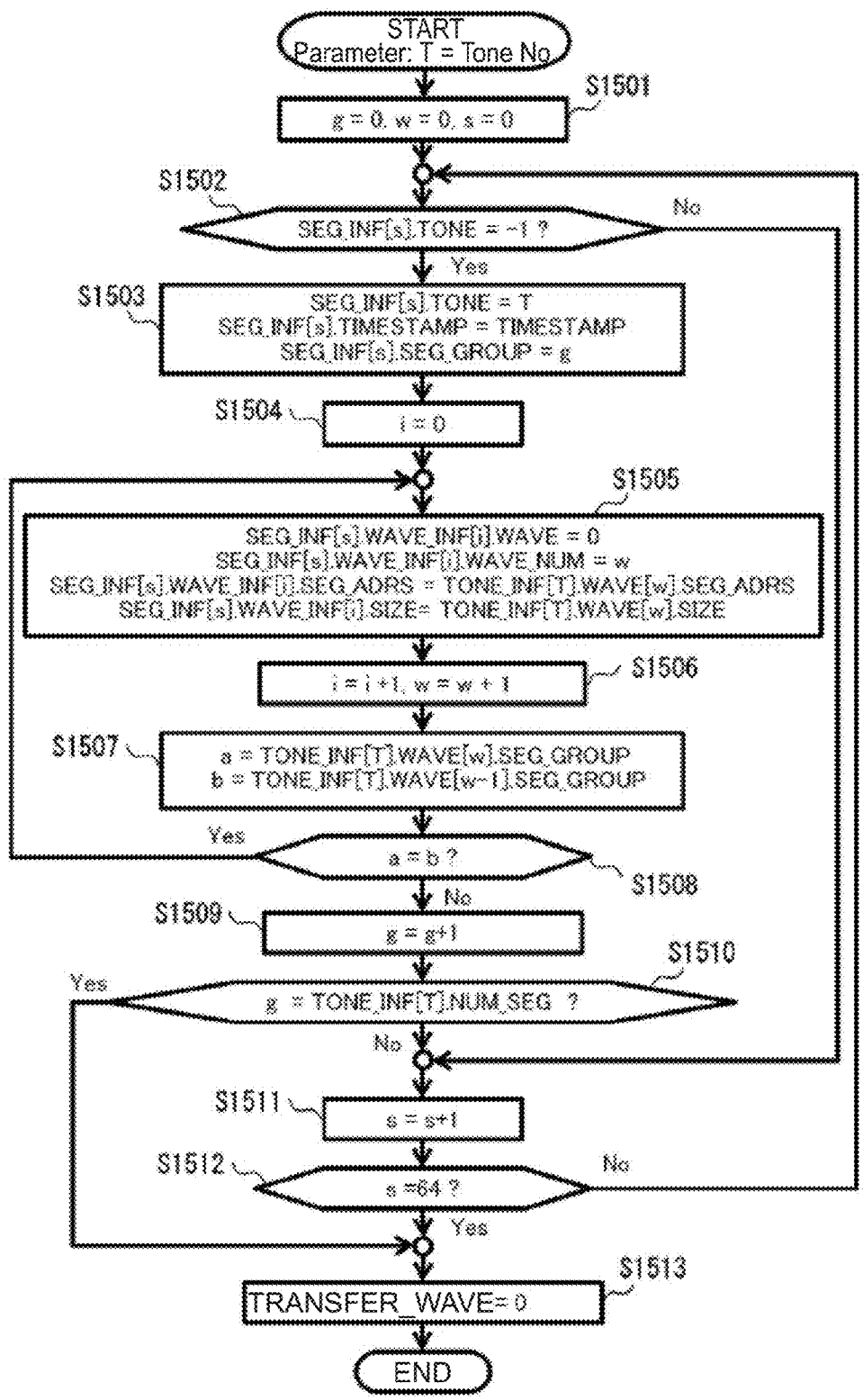
FIG. 15 is a flowchart illustrating a detailed example of a waveform writing instruction routine.

FIG. 15 is a flowchart illustrating a detailed example of the waveform transfer instruction routine of step S1107 in FIG. 11. As described above, this routine is a process for preparing to transfer the waveforms included in the tone corresponding to the specified tone number from the high-capacity flash memory 204 to the waveform memory 206 with the waveform transfer process of step S905 in FIG. 9.

In this preparation process, the necessary information is set to the member variables of the SEG_INF structure (see FIG. 8) in the RAM 203 that corresponds to the free segments in the waveform memory 206 to which the waveforms will be transferred from the high-capacity flash memory 204, and the waveform number stored in the TRANSFER_WAVE variable in the RAM 203 to control the transfer is set to an initial value of 0.

First, in step S1501, the CPU 201 resets all of the following values to 0: the value of a variable g in the RAM 203 for counting the segment groups of the waveforms to be transferred, the value of the variable w in the RAM 203 for counting the waveform numbers of the waveforms included the newly specified tone to be transferred, and the value of the variable s in the RAM 203 for counting the segments in the waveform memory 206.

Next, the CPU 201 repeats the sequence of processes in steps S1502 to S1510 for each segment specified by the value of the variable s while incrementing the value of the variable s by 1 each time in step S1511 until it is determined in step S1512 that the value of the variable s is equal to 64.

First, in step S1502 of this repeated process, the CPU 201 determines whether the value of the SEG_INF[s].TONE variable that stores the tone number that is assigned to the segment corresponding to the value of the variable s is equal to −1 (which indicates that that segment is currently empty (not being used)).

If the result of the determination in step S1502 is No, this means that the corresponding segment is not free, and therefore the CPU 201 proceeds to step S1511 and then repeats the process for the next segment.

If the result of the determination in step S1502 is Yes, the CPU 201 proceeds to step S1503 and stores, in the SEG_INF[s].TONE variable in the RAM 203 that stores the tone number associated with the free segment corresponding to the value of the variable s, the newly specified tone number value stored in the variable T in the RAM 203 that was passed in to the routine as a parameter. Moreover, the CPU 201 stores, in the SEG_INF[s].TIMESTAMP variable that stores the history number used by the segment corresponding to the free segment that corresponds to the value of the variable s, the value of the TIMESTAMP variable in the RAM 203 that was incremented in accordance with the current tone selection event (see step S1102 in FIG. 11) in order to update the history number for that segment. Furthermore, the CPU 201 stores, in the SEG_INF[s].SEG_GROUP variable that stores the segment group value of the tone corresponding to the free segment that corresponds to the value of the variable s, the segment group value of the waveforms that are currently being transferred (which is stored in the variable g).

Next, the CPU 201 proceeds to step S1504 and resets the value of the variable i in the RAM 203 for counting the waveforms to be transferred to the segment corresponding to the current value of the variable s.

Next, the CPU 201 proceeds to step S1505 and repeats the process in step S1505 while incrementing, by 1 each time in step S1506, the value of the variable i for counting the waveforms to be transferred to the segment corresponding to the current value of the variable s as well as the value of the variable w for counting the waveform numbers of the waveforms included the newly specified tone to be transferred. This continues until it is determined in steps S1507 and S1508 that the segment group has changed. In other words, in step S1505 the CPU 201 first sets, to the SEG_INF[s].WAVE_INF[i].WAVE variable that corresponds to the ith (the value of the variable i) waveform in the segment corresponding to the current value of the variable s and that indicates whether that waveform has been transferred, a value of 0 which indicates that the waveform has not been transferred yet. Next, the CPU 201 sets, to the SEG_INF[s].WAVE_INF[i].WAVE_NUM variable that corresponds to the ith waveform in the segment corresponding to the current value of the variable s and that stores the waveform number of that waveform within the specified tone, the waveform number stored in the variable w in the RAM 203 for the waveform that is included in the specified tone and that is currently being transferred. Then, the CPU 201 sets, to the SEG_INF[s].WAVE_INF[i].SEG_ADRS variable that stores the address offset of the ith waveform within the segment corresponding to the current value of the variable s, the address offset value that is stored in the TONE_INF[T].WAVE[w].SEG_ADRS constant (see FIG. 7) in the ROM 202 and corresponds to the wth (the value of the variable w) waveform in the tone corresponding to the tone number T (the value of the variable T) that will be transferred to that segment. Furthermore, the CPU 201 sets, to the SEG_INF[s].WAVE_INF[i].SIZE variable that stores the size of the ith waveform within the segment corresponding to the current value of the variable s, the size value that is stored in the TONE_INF[T].WAVE[w].SIZE constant (see FIG. 7) in the ROM 202 and corresponds to the wth (the value of the variable w) waveform in the tone corresponding to the tone number T (the value of the variable T) that will be transferred to that segment.

After setting the variables in step S1505, the CPU 201 proceeds to step S1506 and increments, both by 1, the value of the variable i for counting the waveforms to be transferred to the segment corresponding to the current value of the variable s as well as the value of the variable w for counting the waveform numbers of the waveforms included the newly specified tone to be transferred.

Next, the CPU 201 proceeds to step S1507 (the segment group information retrieval process) and sets, to a variable a in the RAM 203, the segment group value stored in the TONE_INF[T].WAVE[w].SEG_GROUP constant in the ROM 202 that corresponds to the newly specified wth (the value of the variable w) waveform in the tone corresponding to the tone number T (the value of the variable T) that will be transferred to the segment. Moreover, CPU 201 sets, to a variable b in the RAM 203, the segment group value stored in the TONE_INF[T].WAVE[w−1].SEG_GROUP constant in the ROM 202 that corresponds to the previous (w−1)th (the value of the variable w−1) waveform in the tone corresponding to the tone number T (the value of the variable T) that will be transferred to the segment.

Then, the CPU 201 proceeds to step S1508 and determines whether the segment group value of the newly specified wth waveform in the tone (which is stored in the variable a) is equal to the segment group value of the previous (w−1)th waveform in the tone (which is stored in the variable b).

If the result of the determination in step S1508 is Yes, this means that additional waveforms can be transferred to this segment, and therefore the CPU 201 returns to step S1505 and repeats the setting process for a new waveform.

If the result of the determination in step S1508 is No, the CPU 201 proceeds to step S1509 and increments the segment group value stored in the variable g by 1.

Next, the CPU 201 proceeds to step S1510 and determines whether the value of the variable g has reached the number of segments used value stored in the TONE_INF[T].NUM_SEG constant for the tone number T (the value of the variable T).

If the result of the determination in step S1510 is No, the CPU 201 proceeds to step S1511 and then repeats the transfer process (transfer preparation process) for the next free segment.

Once the result of the determination in step S1510 becomes Yes, this means that the transfer process is complete for all of the waveforms that require the number of segments used value corresponding to the specified tone number T (the value of the variable T), and therefore the CPU 201 proceeds to step S1513 and sets an initial value of 0 to the TRANSFER_WAVE variable in the RAM 203 that stores the waveform number of the waveform that is currently being transferred. Finally, the CPU 201 ends the waveform transfer instruction routine of step S1107 of FIG. 11 as illustrated in the flowchart in FIG. 15.

Figure 16:
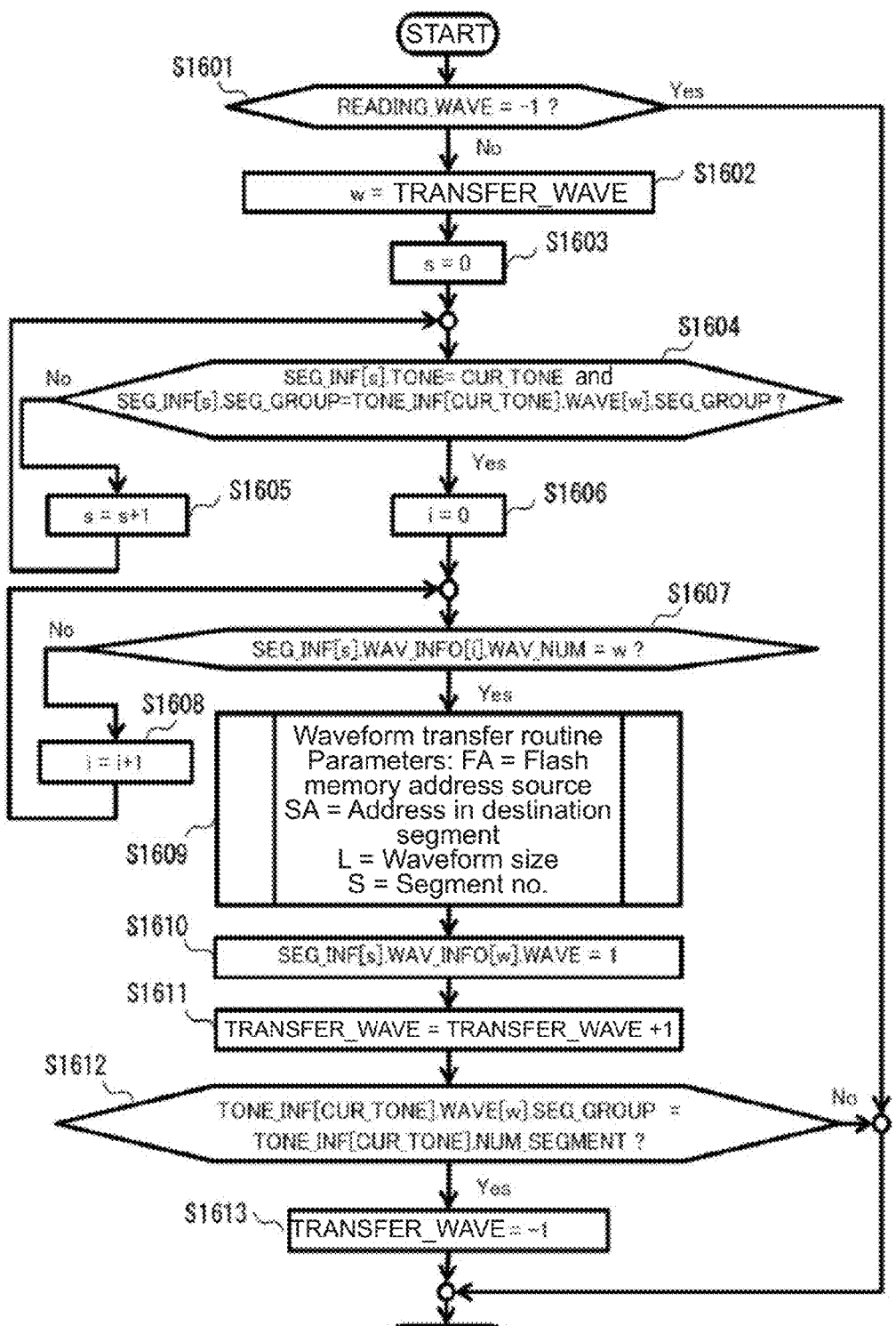
FIG. 16 is a flowchart illustrating a detailed example of a waveform writing process.

FIG. 16 is a flowchart illustrating a detailed example of the waveform transfer process of step S905 in FIG. 9. Here, as described above, the CPU 201 executes a background process to transfer the waveforms from the high-capacity flash memory 204 to the waveform memory 206 illustrated in FIG. 2. As a result, a group of waveforms that are stored in the high-capacity flash memory 204 (the primary storage device) and have the same segment group are transferred as a single group to a segment in the waveform memory 206 (the secondary storage device). Here, the "group of waveforms" is at least one of (1) two or more waveforms for which the segment group information is the same (2) a single waveform for which the segment group information is not the same as that of other waveforms. Furthermore, the group of waveforms are written as a single group to one segment among a plurality of segments that are storage regions of prescribed sizes in the secondary storage device. In other words, a plurality of waveforms that represent a specified musical tone are retrieved from the primary storage device, in which a waveform or waveforms, among the plurality of waveforms, that have the same segment group information are retrieved as a group, and the waveform or waveforms, among the plurality of waveforms, that have the same segment group information is written, as a group, to one of prescribed storage segments that are storage regions of prescribed sizes in the secondary storage device.

First, in step S1601, the CPU 201 determines whether the value of the TRANSFER_WAVE variable in the RAM 203 is −1 (which would indicate that all of the waveforms have been transferred).

If the result of the determination in step S1601 is Yes, this means that the waveform transfer process does not need to be executed, and therefore the CPU 201 immediately ends the waveform transfer process of step S905 of FIG. 9 as illustrated in the flowchart in FIG. 16.

If the result of the determination in step S1601 is No, the CPU 201 proceeds to step S1602 and stores, in the variable w in the RAM 203 that stores the waveform number of the waveform included in the specified tone that is currently being transferred, the waveform number value stored in the TRANSFER_WAVE variable that indicates which waveform should be transferred next.

Next, in step S1603, the CPU 201 resets the value of the variable s in the RAM 203 for counting the segments to 0. The CPU 201 then executes a search process according to the result of a determination in step S1604 while incrementing the value of the variable s by 1 each time in step S1605. In step S1604, the CPU 201 determines whether the value of the SEG_INF[s].TONE variable that stores the tone number assigned to the segment corresponding to the variable s is equal to the tone number that is currently selected for playing music and is stored in the CUR_TONE variable in the RAM 203 (see step S1103 in FIG. 11), and whether the segment group value assigned to the segment corresponding to the variable s that is set to the SEG_INF[s].SEG_GROUP variable is equal to the segment group value of the waveform corresponding to the waveform number in the tone that is currently being transferred, which is stored in the variable w for the tone corresponding to the CUR_TONE variable that is stored in the TONE_INF[CUR_TONE].WAVE[w].SEG_GROUP constant in the ROM 202.

If the process in step S1503 of the waveform transfer instruction routine described above has already been executed, the result of the determination in step S1604 will always be Yes in the repeated process that includes step S1604 and step S1605. Next, in step S1606, the CPU 201 resets the value of the variable i in the RAM 203 for counting the number of waveforms in the segment corresponding to the value of the variable s to 0. The CPU 201 then executes a search process according to the result of a determination in step S1607 while incrementing the value of the variable i by 1 each time in step S1608. In step S1607, the CPU 201 determines whether the waveform number stored in the variable w for the waveform in the specified tone that is currently being transferred is equal to the waveform number of the ith (the value of the variable i) waveform in the specified tone in the segment corresponding to the value of the variable s (which is stored in the SEG_INF[s].WAVE_INF[i].WAVE_NUM variable).

If the process in step S1505 of the waveform transfer instruction routine described above has already been executed, the result of the determination in step S1607 will always be Yes in the repeated process that includes step S1607 and step S1608. Once the result of the determination in step S1607 becomes Yes, the CPU 201 proceeds to step S1609 and executes a waveform transfer routine in order to transfer the waveform in the high-capacity flash memory 204 that has the waveform number stored in the variable w for the tone corresponding to the value of the CUR_TONE variable as the ith (the value of the variable i) waveform of the segment corresponding to the value of the variable s in the waveform memory 206. Here, the CPU 201 sets variables FA, SA, and S in the RAM 203 as parameters. The CPU 201 sets the value of the TONE_INF[CUR_TONE].WAVE[w].SEG_ADRS constant in the ROM 202 (which is referenced using the CUR_TONE variable and the variable w) to the variable FA as the address of the waveform to be transferred in the high-capacity flash memory 204 (the transfer source). Moreover, the CPU 201 sets the value of the SEG_INF[s].WAVE_INF[i].SEG_ADRS variable in the RAM 203 (which is referenced using the variable s and the variable i) to the variable SA as the address offset in the waveform memory 206 (the transfer destination) to which the waveform will be transferred. Furthermore, the CPU 201 sets the value of the SEG_INF[s].WAVE_INF[i].SIZE variable in the RAM 203 (which is referenced using the variable s and the variable i) to the variable L as the size of the waveform to be transferred. Then, the CPU 201 sets the value of the variable s to a variable S. The waveform transfer routine will be described in more detail later.

After completing the waveform transfer routine in step S1609, the CPU 201 proceeds to step S1610 and sets, to the SEG_INF[s].WAVE_INF[i].WAVE variable that corresponds to the ith (the value of the variable i) waveform in the segment corresponding to the current value of the variable s and that indicates whether that waveform has been transferred, a value of 1 which indicates that the waveform has indeed been transferred.

Next, in step S1611, the CPU 201 increments the value of the TRANSFER_WAVE variable that stores the waveform number value of the waveform within the tone that should be transferred next by 1.

Then, in step S1612, the CPU 201 determines whether the segment group value stored in the TONE_INF[CUR_TONE].WAVE[w].SEG_GROUP constant corresponding to the waveform with the waveform number stored in the variable w for the tone corresponding to the CUR_TONE variable has reached the number of segments used value stored in the TONE _INF[CUR_TONE].NUM_SEG constant corresponding to the tone given by the CUR_TONE variable.

If the result of the determination in step S1612 is No, the CPU 201 keeps the incremented value from step S1611 as the value of the TRANSFER_WAVE variable and then ends the waveform transfer process of step S905 of FIG. 9 as illustrated in the flowchart in FIG. 16. Therefore, the next time the waveform transfer process of step S905 is executed, the waveform with the waveform number given by the new value of the TRANSFER_WAVE variable will be transferred.

Meanwhile, if the result of the determination in step S1612 is Yes, this means that all of the waveforms included in the newly specified tone have been transferred, and therefore the CPU 201 stores a value of −1 in the TRANSFER_WAVE variable to indicate that all of the waveforms have been transferred. Finally, the CPU 201 ends the waveform transfer process of step S905 of FIG. 9 as illustrated in the flowchart in FIG. 16.

Figure 17:
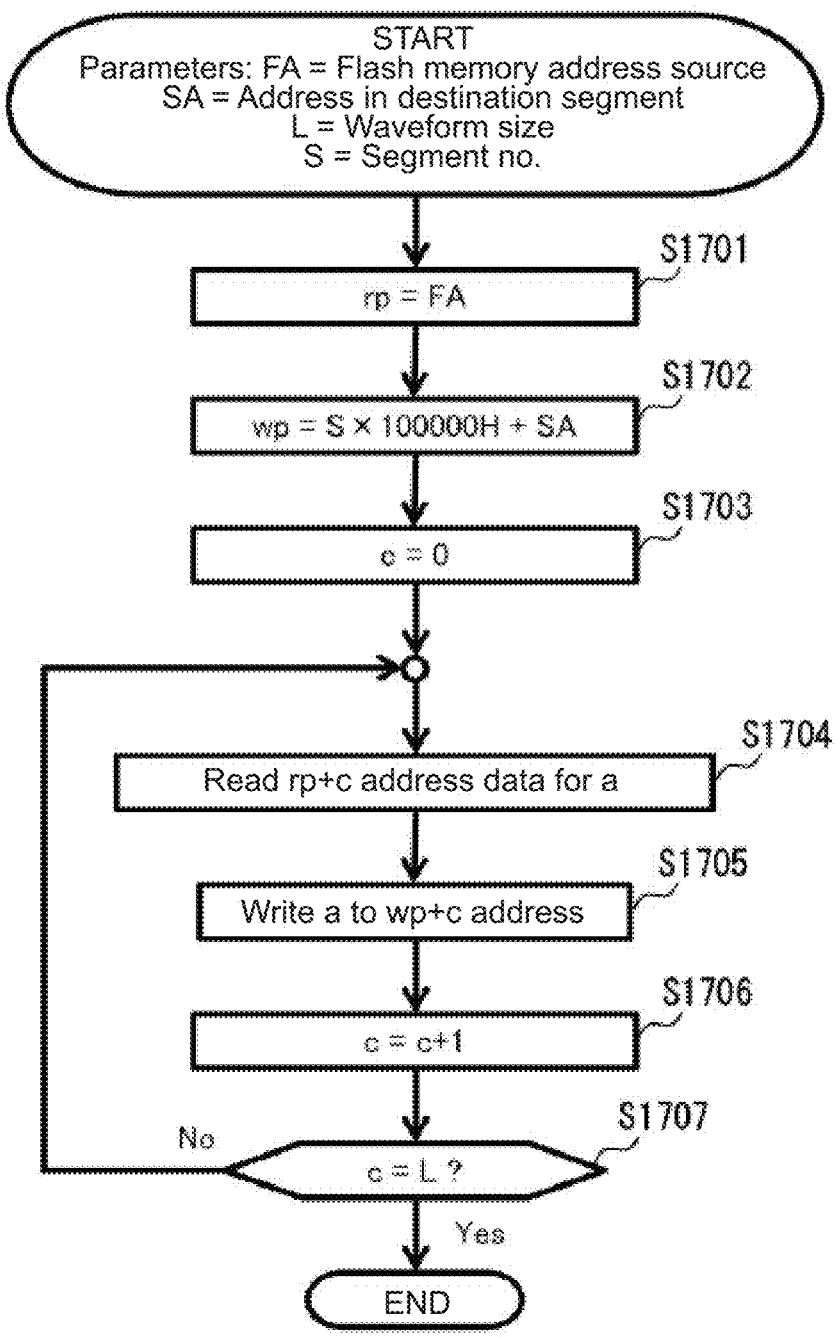
FIG. 17 is a flowchart illustrating a detailed example of a waveform transfer routine.

FIG. 17 is a flowchart illustrating a detailed example of the waveform transfer routine of step S1609 in FIG. 16.

First, in step S1701, the CPU 201 sets, to a variable rp (read pointer) in the RAM 203 that specifies a read address in the high-capacity flash memory 204, the address in the high-capacity flash memory 204 (the transfer source) of the waveform to be transferred (which was passed to this routine at the beginning of step S1609 in FIG. 16 as the variable FA in the RAM 203).

Next, in step S1702, the CPU 201 sets, to a variable wp (write pointer) in the RAM 203 that specifies a write address in the waveform memory 206, an address calculated by substituting the segment number and the in-segment address (which were passed to this routine at the beginning of step S1609 in FIG. 16 as the variables S and SA in the RAM 203, respectively) into the following formula.

$$wp=100000H \times S+SA.$$

As described above, the size of one segment is 100000H bytes, for example, and therefore the 100000H×S quantity in this formula is the starting byte address in the waveform memory 206 of the segment with the segment number stored in the variable S. Furthermore, the address to which the current waveform will transferred is offset from this starting address by the in-segment address value that was passed as the variable SA.

Next, the CPU 201 proceeds to step S1703 and resets the value of a variable c in the RAM 203 that specifies the number of bytes to be transferred to 0. Then, the CPU 201 repeats the processes in steps S1704 and S1705 while incrementing the value of the variable c by 1 sample each time in step S1706 until it is determined in step S1707 that the value of the variable c has reached the data size passed as the variable L in the RAM 203.

First, in step S1704, the CPU 201 reads a sample (a byte value) of the waveform starting from an address in the high-capacity flash memory 204 obtained by adding the value of the variable rp and the value of the variable c and then stores that sample in a variable a in the RAM 203.

Then, in step S1705, the CPU 201 writes the data stored in the variable a to an address in the waveform memory 206 obtained by adding the value of the variable wp and the value of the variable c.

When the result of the determination in step S1707 eventually becomes Yes after this repeated process is complete, the CPU 201 ends the waveform transfer routine of step S1609 of FIG. 16 as illustrated in the flowchart in FIG. 17.

Figure 18:
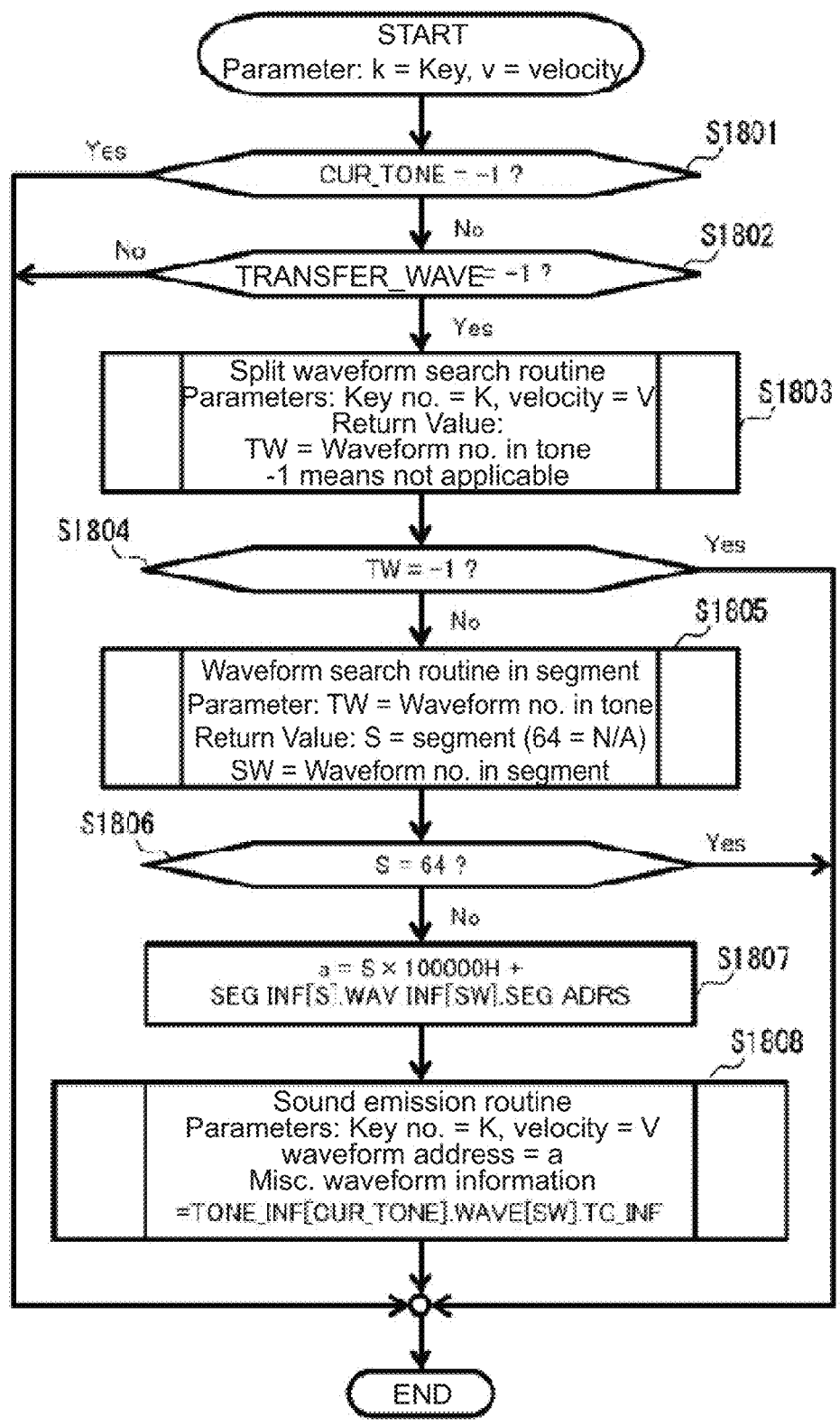
FIG. 18 is a flowchart illustrating a detailed example of a keypress process.

FIG. 18 is a flowchart illustrating a detailed example of the keypress process of step S908 in FIG. 9.

First, in step 1801, the CPU 201 determines whether a value of −1 (which indicates that no tone is currently selected) is stored in the CUR_TONE variable in the RAM 203.

If the result of the determination in step S1801 is Yes, the CPU 201 ends the keypress process of step S908 of FIG. 9 as illustrated in the flowchart in FIG. 18 and does not execute the sound emission process.

If the result of the determination in step S1801 is No, the CPU 201 proceeds to step S1802 and determines whether the value of the TRANSFER_WAVE variable in the RAM 203 is equal to −1 (which indicates that the waveform transfer is complete).

If the result of the determination in step S1802 is No, the CPU 201 ends the keypress process of step S908 of FIG. 9 as illustrated in the flowchart in FIG. 18 and does not execute the sound emission process. In other words, the CPU 201 does not execute the sound emission process until the waveform transfer is complete and the value of the TRANSFER_WAVE variable is set to −1.

If the result of the determination in step S1802 is Yes, the CPU 201 proceeds to step S1803 and executes a split waveform search routine. Here, the CPU 201 stores the key number and velocity obtained in step S902 in FIG. 9 to variables K and V, respectively, in the RAM 203. The routine then searches for and identifies one of the split areas in FIG. 6, for example, and then stores the waveform number corresponding to that split area in the current tone to a variable TW in the RAM 203 as a return value. Moreover, a value of −1 is set to the return value variable TW if a corresponding split area is not found.

Next, in step S1804, the CPU 201 determines whether the return value variable TW is equal to −1.

If the result of the determination in step S1804 is Yes, the CPU 201 ends the keypress process of step S908 of FIG. 9 as illustrated in the flowchart in FIG. 18 and does not execute the sound emission process.

If the result of the determination in step S1804 is No, the CPU 201 proceeds to step S1805 and executes an in-segment waveform search routine. Here, the CPU 201 passes the waveform number in the tone that is stored in the variable TW as a parameter. This routine stores a segment number in the variable S in the RAM 203 as a return value. The routine stores a value of 64 in the return value variable S if the waveform is not found. Moreover, the routine sets the waveform number in the segment to a variable SW in the RAM 203 as a return value.

After completing the in-segment waveform search routine in step S1805, the CPU 201 proceeds to step S1806 and determines whether the return value variable S is equal to 64.

If the result of the determination in step S1806 is Yes, the CPU 201 ends the keypress process of step S908 of FIG. 9 as illustrated in the flowchart in FIG. 18 and does not execute the sound emission process.

If the result of the determination in step S1806 is No, the CPU 201 proceeds to step S1807 and sets an address calculated using the following formula to a variable a in the RAM 203 as the address of the waveform to send to the sound source LSI 205.

$$a = S \times 10000H + SEG\_INF[S].WAVE\_INF[SW].SEG\_ADRS.$$

Similar to in step S1702 of FIG. 17, the 100000H×S quantity in this formula is the starting byte address in the waveform memory 206 of the segment corresponding to the segment number stored in the variable S. This value is added to the in-segment offset address value of the waveform with the waveform number stored in the variable SW for the segment corresponding to the variable S (that is, to the SEG_INF[S].WAVE_INF[SW].SEG_ADRS constant) in order to obtain the starting address in the waveform memory 206 from which the sound source LSI should start reading data.

Next, in step S1808, the CPU 201 executes a sound emission routine on the sound source LSI 205. Here, the CPU 201 passes the key number stored in the variable K, the velocity stored in the variable V, and the address value stored in the variable a to the sound source LSI 205 as parameters. The CPU 201 also passes the TONE_INF[CUR_TONE].WAVE[SW].TG_INF constant (see FIG. 7) that stores a group of parameters for other waveform information to the sound source LSI 205 as a parameter. The sound source LSI 205 then reads the waveform data from the waveform memory 206 and executes the sound emission process in accordance with these parameters. However, this is a well-known process and will therefore not be described in detail here.

Figure 19:
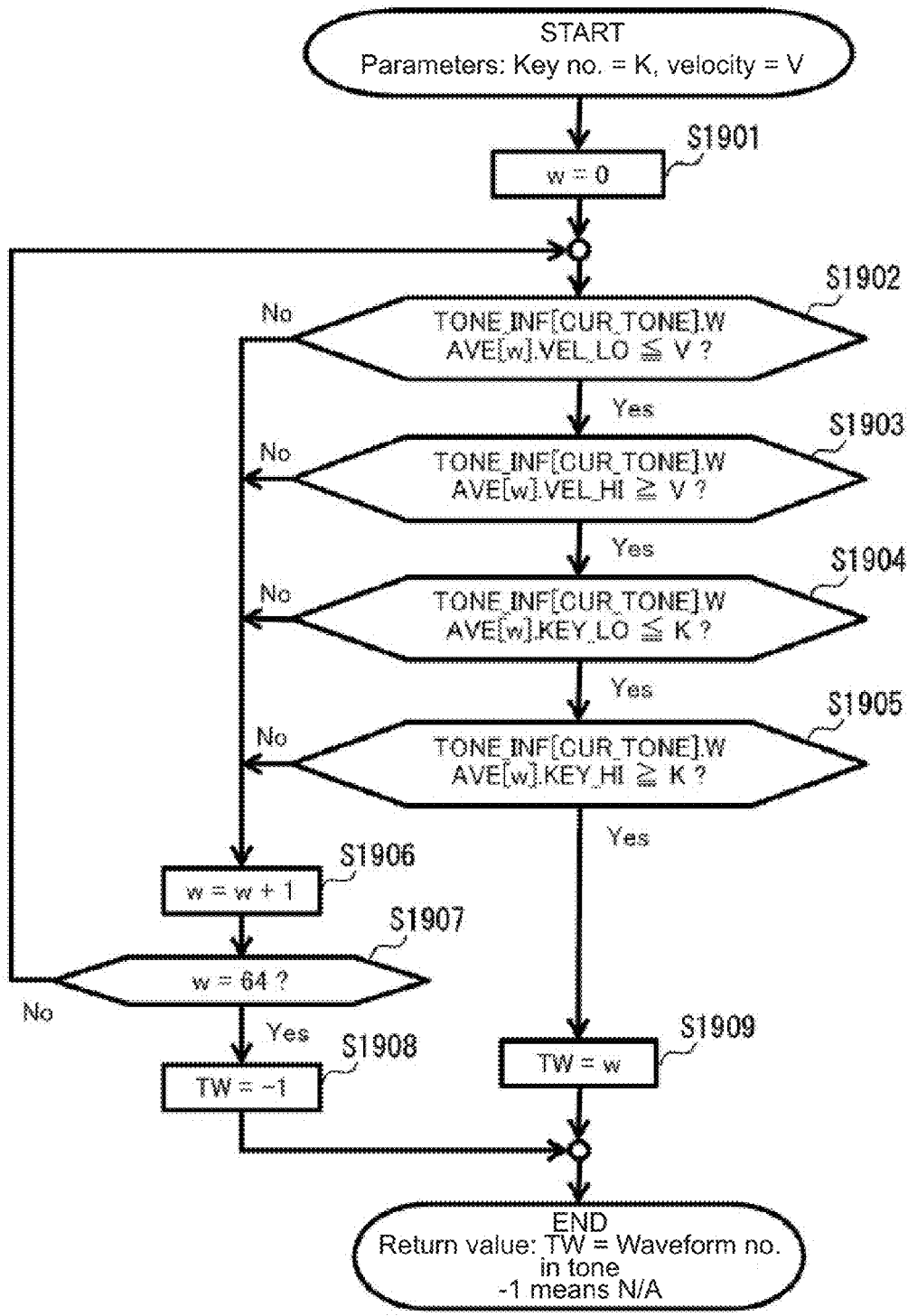
FIG. 19 is a flowchart illustrating a detailed example of a split waveform search routine.

FIG. 19 is a flowchart illustrating a detailed example of the split waveform search routine of step S1803 in FIG. 18.

In step S1901, the CPU 201 resets the value of the variable w in the RAM 203 that stores the waveform number within the tone to 0. Then, the CPU 201 repeats the sequence of determination processes in steps S1902 to S1905 while incrementing the value of the variable w by 1 each time in step S1906 until it is determined in step S1907 that the value of the variable w has reached 64.

First, in step S1902 of this repeated process, the CPU 201 determines whether the velocity passed as the variable V is greater than or equal to the minimum velocity value defined by the TONE_INF[CUR_TONE].WAVE[w].VEL_LO constant in the ROM 202 (which is referenced using the CUR_TONE variable and the variable w).

If the result of the determination in step S1902 is No, the CPU 201 proceeds to step S1906 and then enters the process sequence for the next waveform number.

If the result of the determination in step S1902 is Yes, the CPU 201 then proceeds to step S1903 and determines whether the velocity passed as the variable V is less than or equal to the maximum velocity value defined by the TONE_INF[CUR_TONE].WAVE[w].VEL_HI constant in the ROM 202 (which is referenced using the CUR_TONE variable and the variable w).

If the result of the determination in step S1903 is No, the CPU 201 proceeds to step S1906 and then enters the process sequence for the next waveform number.

If the result of the determination in step S1903 is Yes, the CPU 201 then proceeds to step S1904 and determines whether the key number passed as the variable K is greater than or equal to the minimum key number defined by the TONE_INF[CUR_TONE].WAVE[w].KEY_LO constant in the ROM 202 (which is referenced using the CUR_TONE variable and the variable w).

If the result of the determination in step S1904 is No, the CPU 201 proceeds to step S1906 and then enters the process sequence for the next waveform number.

If the result of the determination in step S1904 is Yes, the CPU 201 then proceeds to step S1905 and determines whether the key number passed as the variable K is less than or equal to the maximum key number defined by the TONE_INF[CUR_TONE].WAVE[w].KEY_HI constant in the ROM 202 (which is referenced using the CUR_TONE variable and the variable w).

If the result of the determination in step S1905 is No, the CPU 201 proceeds to step S1906 and then enters the process sequence for the next waveform number.

If the result of the determination in step S1905 is Yes, the CPU 201 sets the value of the variable w to the return value variable TW as a return value that stores the waveform number within the tone. Then, the CPU 201 ends the split waveform search routine of step S1803 of FIG. 18 as illustrated in the flowchart in FIG. 19.

If the result of the determination in step S1905 is No, the CPU 201 proceeds to step S1906 and then enters the process sequence for the next waveform number.

If the result of the determination in step S1907 becomes Yes once the repeated processes in steps S1902 to S1907 are complete, the CPU 201 sets a value of −1 to the variable TW to indicate that no corresponding waveform was found. Then, the CPU 201 ends the split waveform search routine of step S1803 of FIG. 18 as illustrated in the flowchart in FIG. 19.

Figure 20:
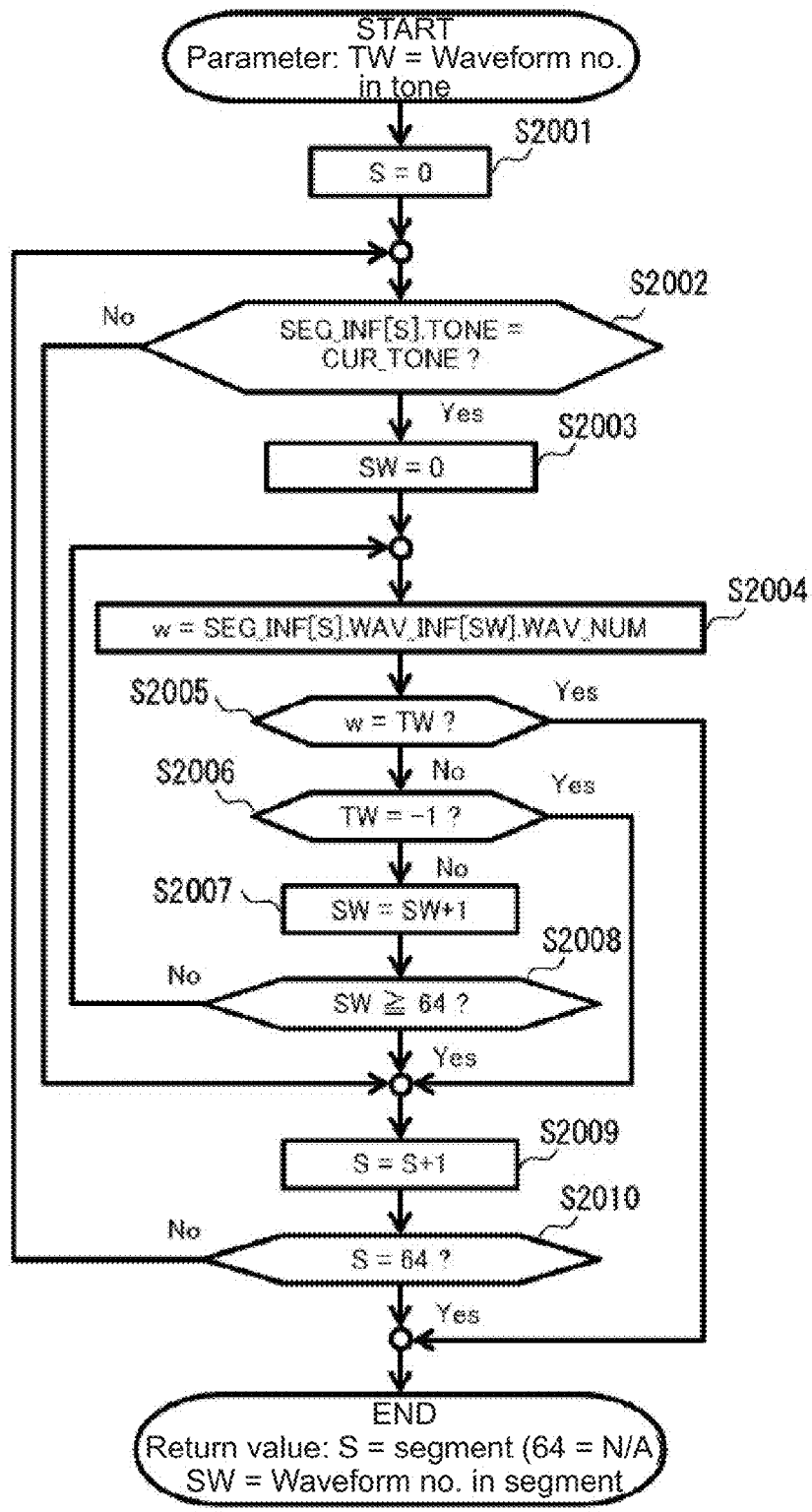
FIG. 20 is a flowchart illustrating a detailed example of an in-segment waveform search routine.

FIG. 20 is a flowchart illustrating a detailed example of the in-segment waveform search routine of step S1805 in FIG. 18.

In step S2001, the CPU 201 resets the value of the variable S in the RAM 203 for counting segments to 0. Then, the CPU 201 repeats the sequence of processes in steps S2002 to S2008 while incrementing the value of the variable s by 1 each time in step S2009 until it is determined in step S2010 that the value of the variable s has reached 64.

First, in step S2002 of this repeated process, the CPU 201 determines whether the tone number set to the segment corresponding to the value of the variable S in the RAM 203 (that is, the value of the SEG_INF[S].TONE variable (see FIG. 8)) is equal to the currently selected tone number that is stored as the value of the CUR_TONE variable in the RAM 203 (see FIG. 8).

If the result of the determination in step S2002 is No, the CPU 201 proceeds to step S2009 and then enters the process sequence for the next segment.

If the result of the determination in in step S2002 is Yes, the CPU 201 proceeds to step S2003 and resets the value of the variable SW in the RAM 203 that stores the in-segment waveform number 0. Then, the CPU 201 repeats the sequence of processes in steps S2004 to S2007 while incrementing the value of the variable SW by 1 each time in step S2007 until it is determined in step S2008 that the value of the variable SW has reached 64.

First, in step S2004 of this repeated process, the CPU 201 stores, in the variable w in the RAM 203, the waveform number in the tone of the SWth (the value of the variable SW) waveform in the segment corresponding to the value of the variable S (which can be referenced as the value of the SEG_INF[S].WAVE_INF[SW].WAVE_NUM variable using the variable S and the variable SW).

Next, in step S2005, the CPU 201 determines whether the value of the variable w is equal to the waveform number in the tone stored in the TW variable in the RAM 203 that was passed in as a parameter.

If the result of the determination in step S2005 is No, the CPU 201 proceeds to step S2006 and determines whether the value of the variable TW is −1.

If the result of the determination in step S2006 is No, the CPU 201 proceeds to step S2007 and then enters the process sequence for the waveform with the next waveform number in the segment.

If the result of the determination in step S2006 is Yes, the CPU 201 proceeds to step S2009 and then enters the process sequence for the next segment.

If the result of the determination in step S2005 becomes Yes during this repeated sequence of processes, the CPU 201 sets the current value of the variable S and the current value of the variable SW as the return value for the segment and the return value for the waveform number within the segment, respectively, and then ends the in-segment waveform search routine of step S1805 of FIG. 18 as illustrated in the flowchart in FIG. 20.

If the result of the determination in step S2010 becomes Yes during this repeated sequence of processes, the CPU 201 sets the return value variable S to a value that indicates that no corresponding segment was found and then ends the in-segment waveform search routine of step S1805 of FIG. 18 as illustrated in the flowchart in FIG. 20.

In the embodiment as described above, when a new tone for which the corresponding waveforms are not currently present in the waveform memory is selected and the waveforms included in that new tone need to be written to the waveform memory, freeing another tone that uses at least the same number of segments makes it possible to always be able to reliably write the new waveforms. For example, when a tone that requires three segments to store the included waveforms is selected, another tone that is currently using three or more segments may be overwritten.

This makes it possible to avoid inefficient situations in which the desired waveforms cannot be written even though the amount of free space in memory is far greater than the total size of those waveforms, thereby removing the need to implement memory management processes such as garbage collection that require a long time to run and impede the ability to play music.

Furthermore, in situations in which the same combination of tones are written to the waveform memory, conditions related to writing new waveforms for a newly selected tone (such as whether the new waveforms can be written as-is in the current state or whether the new waveforms can be written if another tone is overwritten, for example) can be predicted regardless of the order in which waveforms were written in the past, thereby making it possible to provide an electronic musical instrument that is easier to manage.

In addition, the present invention is not limited to the embodiments described above, and various modifications may be made in the implementation of the present invention without departing from the spirit thereof. Moreover, the functionality achieved in the embodiments described above may be combined as appropriate in additional implementations. The embodiments described above include various aspects, and various inventions may be implemented in the form of appropriate combinations of those aspects that exhibit the constituent features disclosed herein. For example, even if several constituent features among all of the constituent features in the embodiments as described above are removed, the resulting configuration in which constituent features have been removed may still be regarded to be within the scope of the present invention as long as the effects of the invention are still achieved.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A device for reading waveform data items of a musical tone from a primary storage device and transferring the read waveform data items to a secondary storage device for reproduction of the musical tone, the device including a processor configured to perform the following processes:
    a segment group information retrieval process that retrieves, for each waveform data item of a plurality of waveform data items that are stored in the primary storage device, segment group information that is stored in the primary storage device and is respectively associated with each waveform data item, the plurality of waveform data items representing a musical tone;
    a waveform group retrieval process that retrieves the plurality of waveform data items that represent the musical tone from the primary storage device, the waveform group retrieval process retrieving a waveform data item or waveform data items, among the plurality of waveform data items, that have the same segment group information as a group; and
    a writing process that writes, as a single group, the waveform data item or waveform data items, among said plurality of waveform data items, that have the same segment group information onto one of prescribed storage segments that are storage regions of prescribed sizes in the secondary storage device.

2. The device according to claim 1, wherein when a plurality of the groups of waveform data items are retrieved by the waveform group retrieval process, the writing process writes waveform data items with different segment group information onto different storage segments in the secondary storage device.

3. The device according to claim 1, wherein the prescribed sizes of the plurality of the storage segments in the secondary storage device are all the same size.

4. The device according to claim 1, wherein a total size of each group of waveform data items for the musical tone is not greater than any of the prescribed sizes of the respective storage segments in the secondary storage device.

5. The device according to claim 1, wherein a size of each waveform data item is not greater than any of the prescribed sizes of the respective storage segments in the secondary storage device.

6. The device according to claim 1, wherein the primary storage device includes a flash memory, and the secondary storage device includes a random-access memory that has a smaller capacity than the primary storage device.

7. The device according to claim 1,
    wherein the processor further performs:
        a specification process that specifies a musical tone among a plurality of prescribed musical tones; and
        a determination process that determines whether a plurality of waveform data items that represent the specified musical tone are already stored in the secondary storage device, wherein, when the processor determines that said plurality of waveform data items that represent the specified musical tone are not already stored in the secondary storage device, the processor performs said segment group information retrieval process and said waveform group retrieval process with respect to the specified musical tone, and performs:

a storage segment allocation process that allocates, in the secondary storage device, a number of storage segments corresponding to a number of the groups of waveform data items in the specified musical tone; and said writing process so that the groups of waveform data items are respectively written onto the storage segments allocated by the segment allocation process.

8. The device according to claim 7, wherein the processor further performs a retrieval process that retrieves a number of free storage segments among the plurality of prescribed storage segments in the secondary storage device, and wherein when the retrieved number of free storage segments is greater than or equal to the number of groups of waveform data items in the specified musical tone, the storage segment allocation process allocates a number of free storage segments equal to the number of groups in the specified musical tone, and when the retrieved number of free storage segments is less than the number of groups in the specified musical tone, the storage segment allocation process allocates any remaining free storage segments as well as a storage segment or segments that satisfy a prescribed condition among the storage segments that are not free.

9. The device according to claim 8, wherein the storage segment or segments that satisfy said prescribed condition are a storage segment or segments that have been storing waveform data items that represent another musical tone for the longest period of time among the storage segments that are not free in the secondary storage device.

10. A method to be performed by a processor for reading waveform data of a musical tone from a primary storage device and transferring the read waveform data to a secondary storage device for tone reproduction, the method comprising:

a segment group information retrieval process that retrieves, for each waveform data item of a plurality of waveform data items that represent a musical tone stored in the primary storage device, segment group information that is also stored in the primary storage device and is respectively associated with each waveform data item;

a waveform group retrieval process that retrieves the plurality of waveform data items that represent the musical tone from the primary storage device, the waveform group retrieval process retrieving a waveform data item or waveform data items, among the plurality of waveform data items, that have the same segment group information as a group; and a writing process that writes, as a single group, the waveform data item or waveform data items, among said plurality of waveform data items, that have the same segment group information onto one of prescribed storage segments that are storage regions of prescribed sizes in the secondary storage device.

11. An electronic musical instrument, comprising:
the waveform writing device according to claim 1;
the primary storage device;
the secondary storage device; and
a sound source that generates musical notes from the waveform data items written to the secondary storage device.

12. A non-transitory computer-readable storage medium having stored therein a program executable by a processor in a device for reading waveform data of a musical tone from a primary storage device and transferring the read waveform data to a secondary storage device for tone reproduction, the program causing the processor to perform the following processes:

a segment group information retrieval process that retrieves, for each waveform data item of a plurality of waveform data items that represent a musical tone stored in the primary storage device, segment group information that is also stored in the primary storage device and is respectively associated with each waveform data item;

a waveform group retrieval process that retrieves the plurality of waveform data items that represent the musical tone from the primary storage device, the waveform group retrieval process retrieving a waveform data item or waveform data items, among the plurality of waveform data items, that have the same segment group information as a group; and a writing process that writes, as a single group, the waveform data item or waveform data items, among said plurality of waveform data items, that have the same segment group information onto one of prescribed storage segments that are pre-defined storage regions of prescribed sizes in the secondary storage device.

* * * * *